United States Patent
Mogensen et al.

(10) Patent No.: US 7,918,632 B2
(45) Date of Patent: Apr. 5, 2011

(54) WIND TURBINE NACELLE

(75) Inventors: Morten Mogensen, Bramming (DK); Carsten Bruun Andersen, Arhus V (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/722,965

(22) Filed: Mar. 12, 2010

(65) Prior Publication Data

US 2010/0239416 A1  Sep. 23, 2010

Related U.S. Application Data

(60) Provisional application No. 61/159,989, filed on Mar. 13, 2009.

(30) Foreign Application Priority Data

Mar. 13, 2009  (DK) ................................ 2009 00361

(51) Int. Cl.
  *B60P 3/40* (2006.01)
(52) U.S. Cl. ........................................... 410/44
(58) Field of Classification Search .................. 410/44; 254/133 R, 134; 416/146 R
  See application file for complete search history.

(56) References Cited

U.S. PATENT DOCUMENTS

| | | | | | |
|---|---|---|---|---|---|
| 2,267,702 | A | * | 12/1941 | Dean et al. | 105/363 |
| 2,808,288 | A | * | 10/1957 | Benson | 410/68 |
| 3,358,616 | A | * | 12/1967 | Brodhead | 410/44 |
| 4,209,892 | A | * | 7/1980 | Hofstaedter et al. | 29/469 |
| 5,488,770 | A | * | 2/1996 | Yamada et al. | 29/897.2 |
| 6,837,459 | B2 | * | 1/2005 | Gonidec et al. | 244/53 B |
| 7,594,474 | B2 | * | 9/2009 | Zupancich | 105/377.01 |
| 7,657,988 | B2 | * | 2/2010 | Greene | 29/464 |
| 2009/0191051 | A1 | * | 7/2009 | Bagepalli et al. | 415/182.1 |
| 2010/0143062 | A1 | * | 6/2010 | Tobergte | 410/44 |

FOREIGN PATENT DOCUMENTS

| | | |
|---|---|---|
| DE | 10340560 A1 | 7/2007 |
| DE | 102006001931 A1 | 7/2007 |
| EP | 1 336 755 A1 | 8/2003 |
| FR | 2927375 A1 * | 8/2009 |
| FR | 2937689 A1 * | 4/2010 |
| WO | WO 2007/132408 | 11/2007 |
| WO | WO 2007/132408 A2 | 11/2007 |

OTHER PUBLICATIONS

DKPTO Office Action dated Oct. 27, 2009.

* cited by examiner

*Primary Examiner* — H Gutman

(74) *Attorney, Agent, or Firm* — Cohen Pontani Lieberman & Pavane LLP

(57) ABSTRACT

A nacelle for a wind turbine, the nacelle having a first height in its installed position and a second height in its transported position, the first height being higher than the second height, comprising a bottom part having a bottom face and two opposite side faces defining a space and a width of the bottom part and a top part. In the transported position, the top part extends inside the width or outside the width in order to cover at least part of the space. The invention also relates to a transportation kit and a transport method.

19 Claims, 29 Drawing Sheets

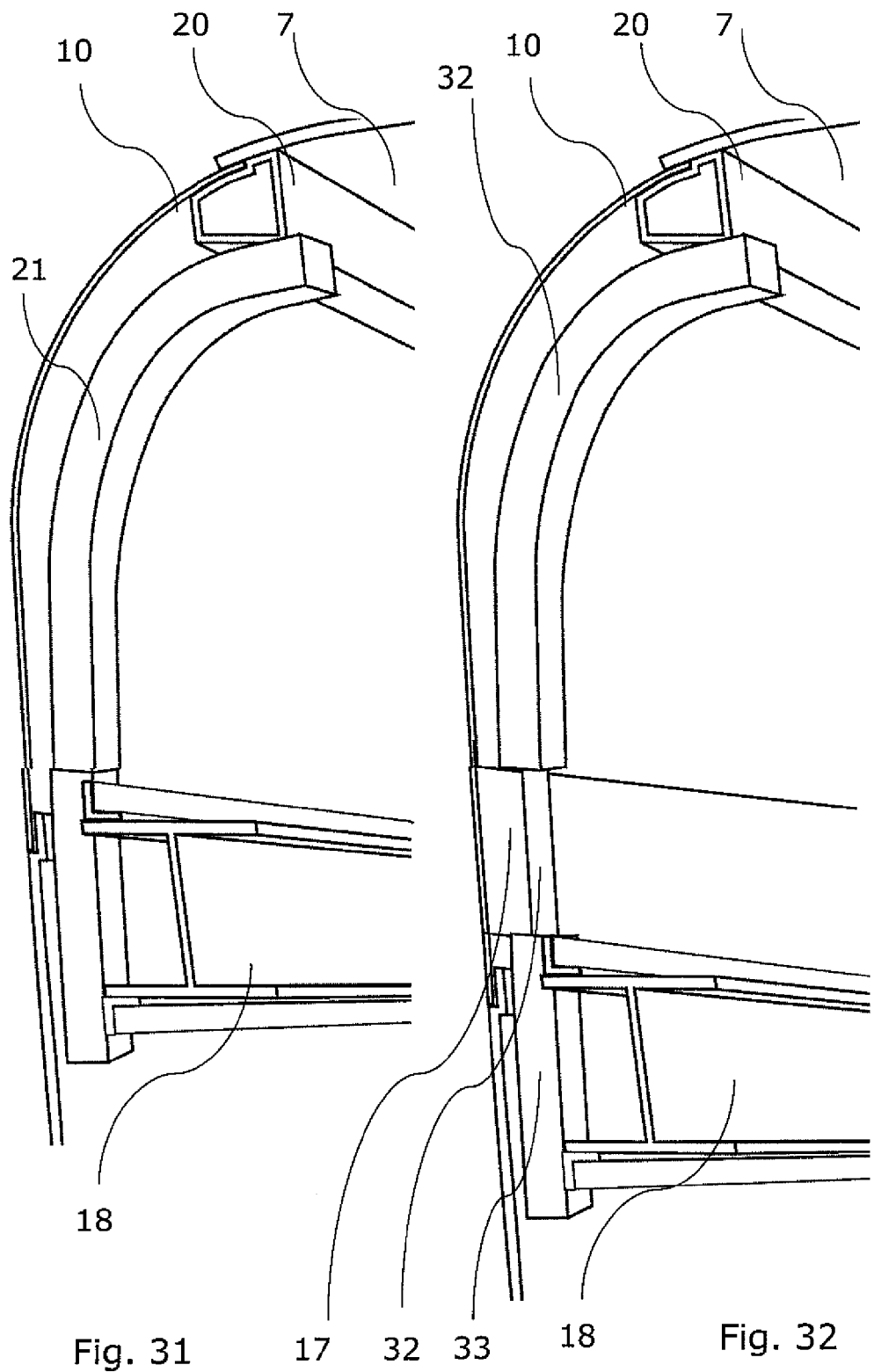

WIND TURBINE NACELLE

RELATED APPLICATIONS

This application claims priority from U.S. Provisional Patent Application Ser. No. 61/159,989 which was filed on Mar. 13, 2009 and Denmark Patent Application Number PA 200900361 which was filed on Mar. 13, 2009, the entire contents of which are incorporated by reference.

BACKGROUND OF THE INVENTION

1. Field of the Invention

The present invention relates to a nacelle for a wind turbine, the nacelle having a first height in its installed position and a second height in its transported position, the first height being higher than the second height, comprising a bottom part having a bottom face and two opposite side faces defining a space and a width of the bottom part and a top part.

2. Description of the Related Art

Transportation of large elements on a truck requires special transport equipment in order to adjust the truck to suit the particular element to be transported. Furthermore, national regulations of a country or a state may require that the transport does not exceed a certain height or a certain weight.

In many countries in Europe and in USA, a certain overall height has been specified which a truck including an element may not exceed. In order to comply with these regulations, special transport equipment enabling the element to be transported on a platform lowered down between a front part of a truck and a rear part of a truck may be required.

Even though the transport equipment is designed to minimise the overall height, the overall height of the element and the transport equipment may for some elements, such as a large wind turbine nacelle, still be too high. In such cases, the element has to be transported in two or more parts and, thus, assembled when arriving at its destination.

SUMMARY OF THE INVENTION

An object of the present invention is, at least partly, to overcome the above disadvantages and drawbacks of the prior art and to provide an improved nacelle for a wind turbine which is easier to transport, even if the nacelle is a large nacelle.

The above object, together with numerous other objects, advantages, and features, which will become evident from the below description, is accomplished by a solution in accordance with the present invention by a nacelle for a wind turbine having a first height in its installed position and a second height in its transported position, the first height being higher than the second height, comprising a main frame structure, a bottom part connected to the main frame structure and having a bottom face and two opposite side faces defining a space and a width of the bottom part and a top part, wherein the top part in the transported position extends inside the width or outside the width in order to cover at least part of the space.

In this way, the top part can be used to cover the bottom part during transport so as to prevent dirt etc. from entering the bottom part from above. In addition, no separate vehicle is needed to transport the top part, as both the top part and the bottom part can be transported on one vehicle when the height of the nacelle is adjustable.

In one embodiment, the top part may comprise two parts which in the transported position of the nacelle are separated from each other in order for the top part to extend outside the width of the nacelle or overlap each other in order for the top part to extend inside the width of the nacelle.

It is thus not necessary to press the side faces towards or away from each other in order to minimise the height of the nacelle during transport. Furthermore, the top part does not get scratched during insertion of the top part between the side faces.

The top part may moreover comprise a top face and two intermediate parts intermediate the side faces and the top face, which two intermediate parts are dismounted in the transported position.

In an alternative solution according to the invention, the nacelle may have a first height in its installed position and a second height in its transported position, the first height being higher than the second height, the nacelle comprising a main frame structure, a bottom part connected to the main frame structure and having a bottom face and two opposite side faces defining a space and a width of the bottom part and a top part. In this solution, the top part may comprise a top face and two intermediate parts intermediate the side faces and the top face, the intermediate parts being dismounted in the transported position and the top face being arranged on the side faces of the bottom part in order to cover at least part of the space.

Thus, the top face can easily be arranged inside the width of the bottom part, and the intermediate parts can be placed within or outside the nacelle during transport.

The transportation height of the nacelle may be equal to or lower than 4 meters, preferably 3.9 meters, more preferably 3.3 meters.

Thus, the maximum height of the nacelle during transport complies with the maximum height for passing under bridges and through tunnels etc. specified by a number of European countries and in USA.

Moreover, the nacelle may further comprise a main frame structure arranged so that at least part of the top part can be supported by the main frame structure during transport.

The main frame structure may thus support the top part of the nacelle when the top part extends inside the width of the bottom part of the nacelle.

In one embodiment, the main frame structure may comprise at least two support beams arranged along each side face.

Thus, the top part of the nacelle may be supported along its longitudinal extension, preferably along its entire longitudinal extension.

In addition, the nacelle may comprise at least one connection part for connecting the top part to the bottom part, the connection part being substantially inside the nacelle in its installed position.

The connection part may be a detachable part so that it can be removed and used as support for at least part of the top part in the transported position.

The nacelle may moreover comprise a transport kit having transportation parts for enabling a cover of the space during transport.

In one embodiment, the transportation parts may be arranged partly inside the nacelle during transport to provide a support of at least part of the top part.

Thus, if it is not possible to place the top part so that it covers the space within the bottom part of the nacelle, the transportation parts can be used to prolong the top part to the sides and at the front and back ends, thus sealing off the space.

In a further embodiment, the transportation parts may comprise sealing means.

Thus, the transportation parts may facilitate a waterproof connection between the top part and the main frame structure within the bottom part of the nacelle.

The nacelle may further comprise a plurality of rafters.

In one embodiment, some of the rafters may be adjustable in height.

When the height of the rafters is adjustable, the rafters can be used to support the top part during transport by lowering the height of the rafters, thus also lowering the height of the nacelle.

In addition, the nacelle may further comprise detachable end faces.

When the end faces are detachable, they may be manufactured in one piece, thus making them more rigid and adding greater stability to the nacelle. During transport, the detachable end faces may be placed inside the nacelle, end to end with the nacelle, or askew so as to comply with the requirements concerning maximum transportation height.

However, the detachable end faces may also be a part of the front or back ends of the nacelle.

In one embodiment, part of the intermediate part may overlap a predetermined part of the top face in the installed position whereas, in the transported position, the intermediate part overlaps a lesser part of the top face than the predetermined part.

Thus, the top part can be prolonged to the sides during transport while still having sealing ability as the intermediate part and the top face still overlap.

The invention also relates to a transport method for transporting a nacelle as described above, the method comprising the step of placing at least part of the top part in a transported position in which part of the top part overlaps part of the side faces of the bottom part.

In addition, the transport method may further comprise the step of placing intermediate parts and/or connection parts inside the space.

BRIEF DESCRIPTION OF THE DRAWINGS

The invention and its many advantages will be described in more detail below with reference to the accompanying schematic drawings which, for the purpose of illustration, show some non-limiting embodiments and in which FIGS. 31 and 32 show how the rafters can be minimised during transport.

All the drawings are schematic and not necessarily to scale, and they show only those parts necessary to elucidate the invention, other parts being omitted or merely suggested.

DETAILED DESCRIPTION OF THE PRESENTLY PREFERRED EMBODIMENTS

Figure 1:
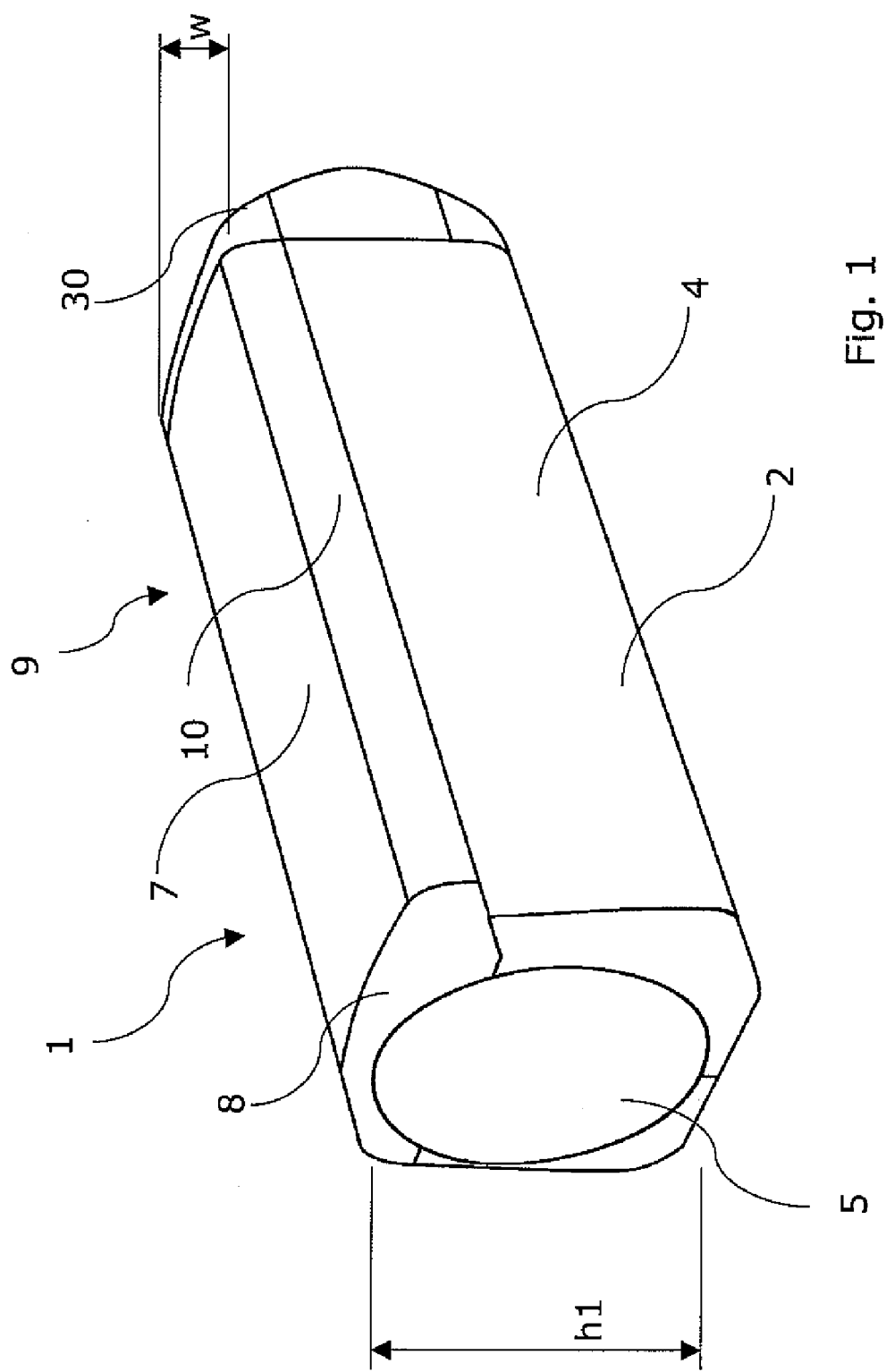
FIG. 1 shows a wind turbine nacelle according to the invention in its installed position.

A wind turbine nacelle is shown in FIG. 1. When a wind turbine nacelle 1 is installed, the nacelle is positioned on a tower (not shown) and connected to three rotor blades through a hub (not shown) in a front end 8 of the nacelle. The hub with rotor blades is always turned to face the wind and the turning movement is performed in a yaw of the bottom of the wind turbine nacelle 1 in the connection with the tower. The nacelle 1 is usually constructed having a main frame structure 12 comprising a bottom frame extending from the yaw, which bottom frame supports the nacelle, the hub, and the rotor blades. The nacelle 1 has a cover 9 in order to protect the interior parts of the nacelle, such as the generator, the gear, etc., which parts together is called the drive train 26. In this way, the weight of the nacelle, the hub, and the rotor blades is distributed by the bottom structure to the tower.

The cover 9 is fastened to the frame, typically to the bottom of the frame, and the cover is a self-supporting construction carrying its own weight. When the nacelle 1 is assembled, it has a first height h1 which is also its installation height h1. When transporting the nacelle 1 on a vehicle, such as a truck bed, the maximum height of the nacelle must not exceed 3.3 meters in many of the European countries and in the USA.

However, the nacelle may have a height of up to 4 meters if loaded onto a special transportation system where the nacelle is lowered down between a rear truck bed and a front truck bed on a separate transportation frame.

In order to comply with these restrictions, a prior art nacelle is separated into a bottom and a top part when it is to be transported, and each part is transported on a separate truck bed. Each part is covered by a tarpaulin so that rain and dirt whirled around during transport does not enter the interior of the nacelle.

When transporting the wind turbine nacelle, the drive train may be transported separately or mounted within the nacelle. If the nacelle weighs too much, the drive train is transported separately.

In the solution of the present invention, the nacelle 1 has a bottom part 2, an end part, and a top part 6. The bottom part 2 has two opposing side faces 4 and during transport the top part 6 and the end part are separated from the bottom part and the top part is arranged inside or outside the bottom part. The top part 6 may thus be positioned in a second position inside the bottom part 2 so that the overall height of the nacelle is reduced to comply with the transport restrictions in e.g. Europe and USA. In addition, the top part 6 also at least partly covers the bottom part 2 during transport, thus making a tarpaulin expendable.

In one embodiment of the invention, the side faces 4 of the bottom part 2 are bent somewhat outwards in order to receive the top part 6 between the side faces. In another embodiment, the side faces 4 of the bottom part 2 are bent somewhat inwards so that the top part 6 extends on the outside of the two side faces. In both embodiments, the top part 6 is used as a roof part during transport, covering the space 5 within the wind turbine nacelle 1. Furthermore, due to the fact that the top part 6 in this way at least partly overlaps or extends within the bottom part 2, the overall height of the nacelle 1 is reduced. Moreover, a second truck bed is no longer needed.

Figure 2:
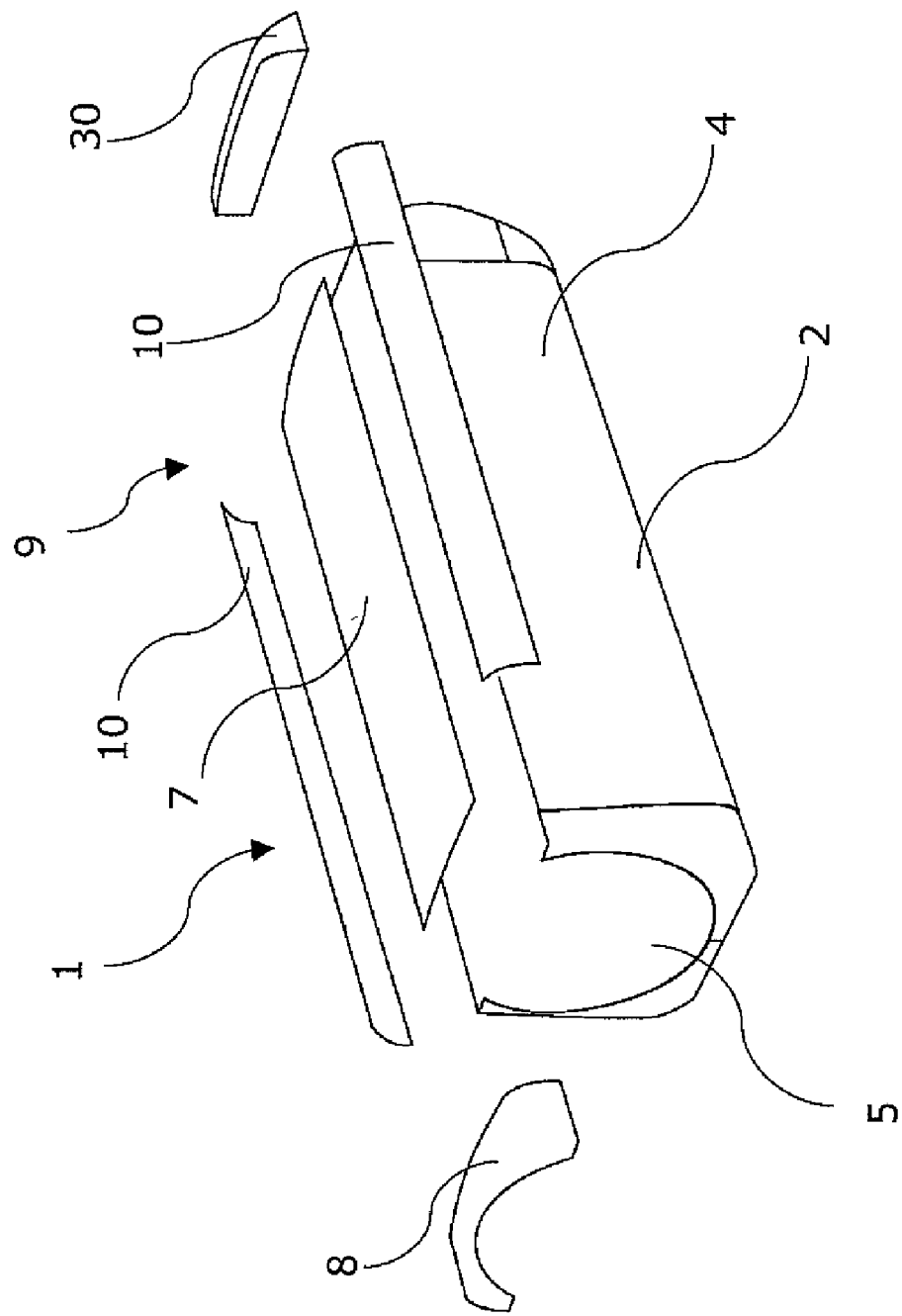
FIG. 2 shows the nacelle of FIG. 1 where the top part of the nacelle cover has been dismounted.

The wind turbine nacelle 1 of FIG. 1 can be separated into a front part 8, a back part 30, a bottom part 2, and a top part 6. The top part 6 comprises a top face 7 and two intermediate parts 10. Before transport, the separated front part 8, back part, and intermediate parts 10 are positioned inside the interior space 5 of the nacelle 1. Subsequently, the top face 7 is arranged on an internal main frame structure 12 so as to form the roof of the nacelle 1 and thus close off the interior of the nacelle as shown in FIG. 2. In another embodiment, the top face 7 is supported directly on the side faces 4 of the bottom part 2 instead of on the main frame structure 12.

By dividing the top part 6 into several parts, the overall height of the nacelle 1 can be reduced during transport without reducing the installation height h1. As wind turbines are constructed still larger, the need for such a separable wind turbine nacelle 1 is increasing. The height h1 of the installed wind turbine nacelle 1 is determined by the drive train 26 and the travelling crane operating above the drive train, which is used for maintenance and repair work. The travelling crane moves back and forth on wheels rolling on rails or a support beam, such as an I-profile, on top of the main frame structure 12.

As can be seen from FIG. 2, only a top part of the end of the nacelle 1 is separated from the bottom part 2 during transport. In this way, the stability of the wind turbine nacelle 1 is maintained.

Figure 3:
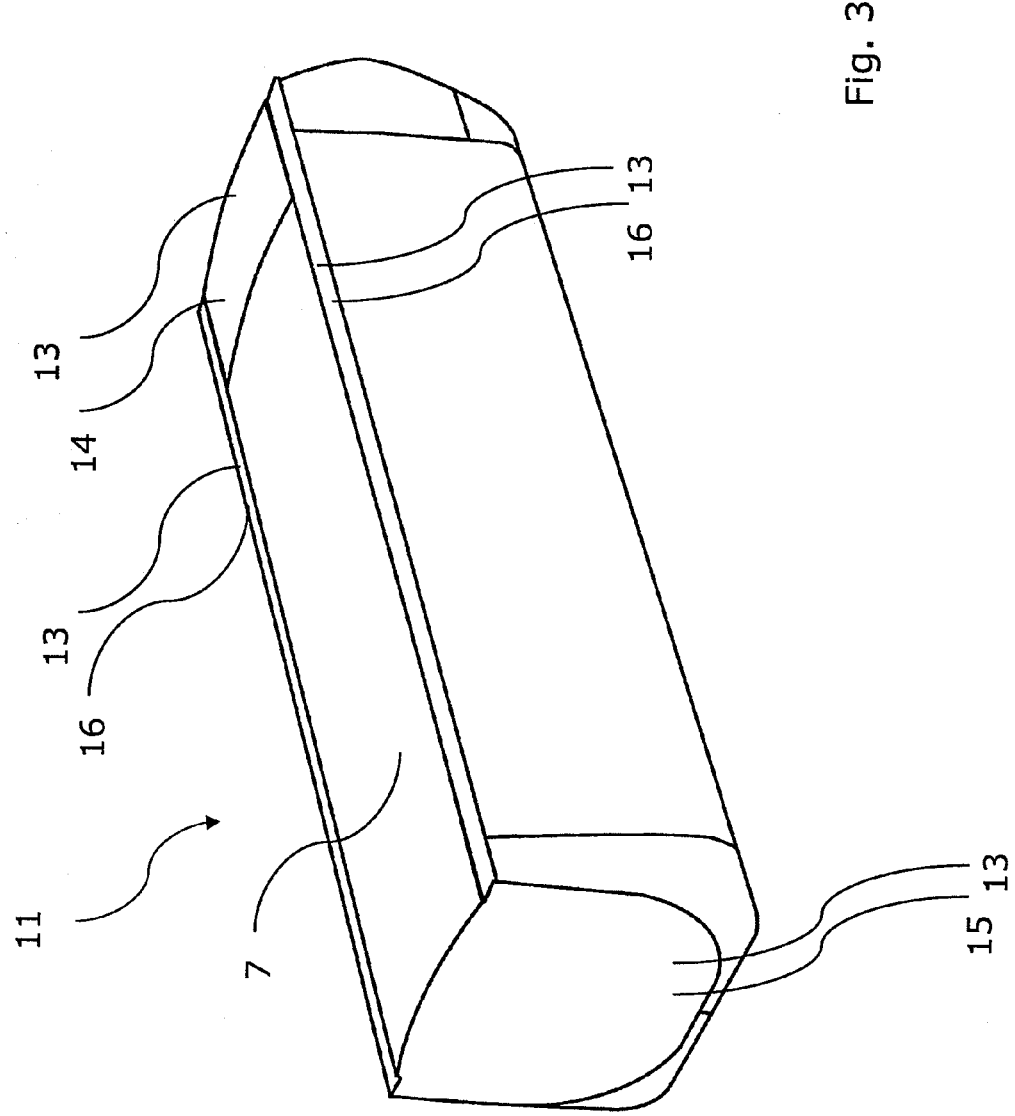
FIG. 3 shows the nacelle of FIG. 1 in its transported position.

The top face 7 covers part of the nacelle 1. However, in order to close or seal off the rest of the interior of the nacelle 1, a transportation kit 11 comprising different transportation parts 13 are arranged to close or seal off the rest of the nacelle 1, as shown in FIG. 3. To seal off the interior of the nacelle 1, the transportation parts 13 may be equipped with sealing means arranged along the edges of each transportation part.

Figure 4:
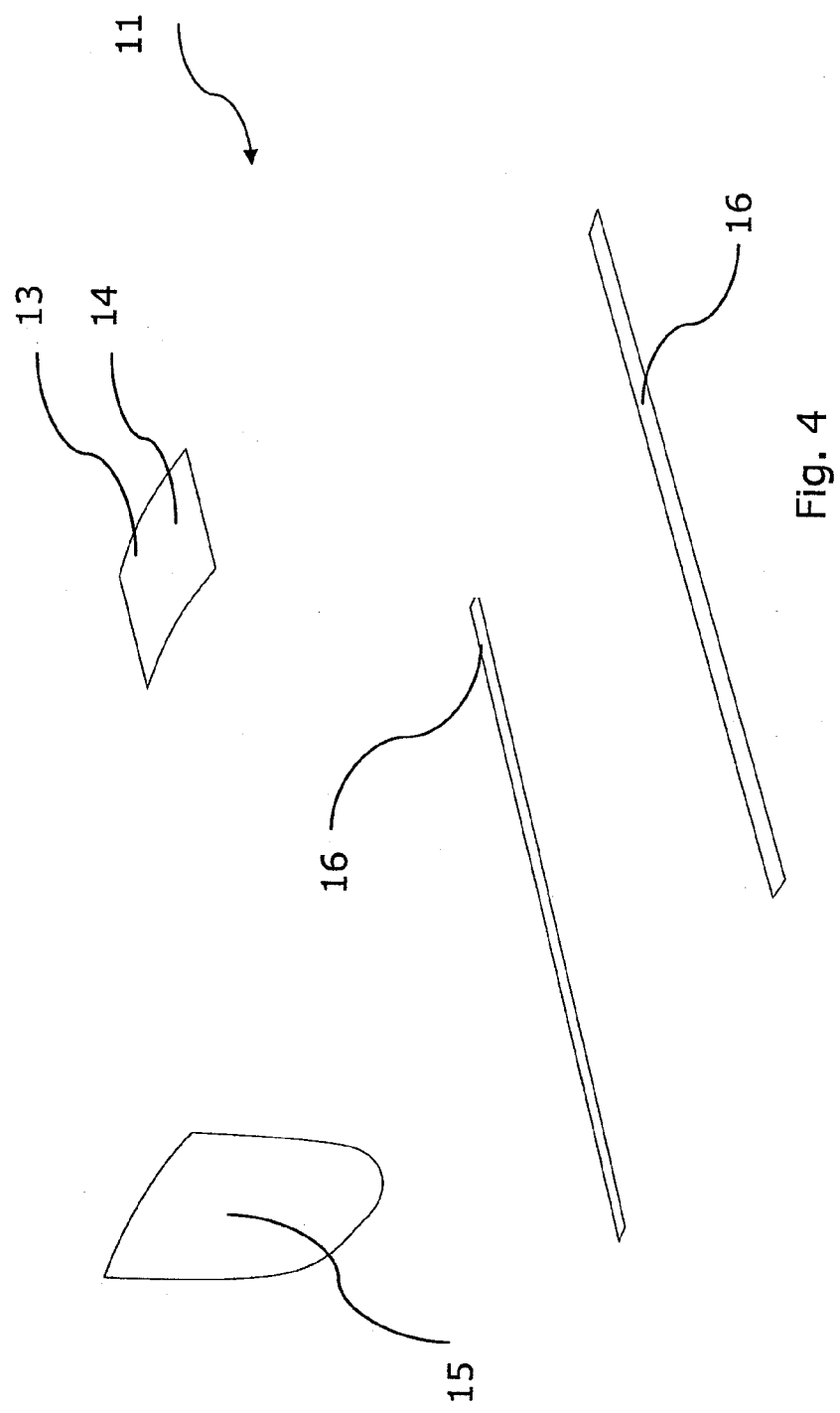
FIG. 4 shows a transportation kit.

In the embodiment of FIGS. 3 and 4, the transportation kit 11 comprises five transportation parts 13, i.e. a back portion 14, a front portion 15, two side portions 16, and a top portion 17. These portions are shown in an exploded view in FIG. 4. The transportation parts 13 may also be made of a sealing material so that separate sealing means is unnecessary, or the portions may be arranged so that water flows from one transportation part onto another and away from the nacelle 1.

As can be seen in FIG. 4, the transportation kit parts 13 are made from a substantially rigid material so that each part can carry its own weight. Due to the fact that the transportation parts 13 are substantially rigid compared to a prior art cover solution, such as a tarpaulin, the transportation parts can be reused several times for transport of several wind turbine nacelles. When one wind turbine has been installed, the transportation kit 11 is sent back to the manufacturing plant and is mounted on a new wind turbine nacelle for transportation of the new wind turbine nacelle.

The prior art tarpaulins could not be reused since they always suffered too much damage during transport. Deploying the transportation kit 11 instead, the kit can be reused and when the kit parts 13 are too damaged, they may be granulated and remoulded into new kit parts. In this way, the material of the transportation parts 13 can be reused over and over again. The transportation parts 13 may be moulded or vacuum formed from any kind of plastic, such as polyethylene (PE), polyurethane (PUR), polyethylene terephthalate (PET), acrylonitrile butadiene styrene (ABS), etc.

Figure 5:
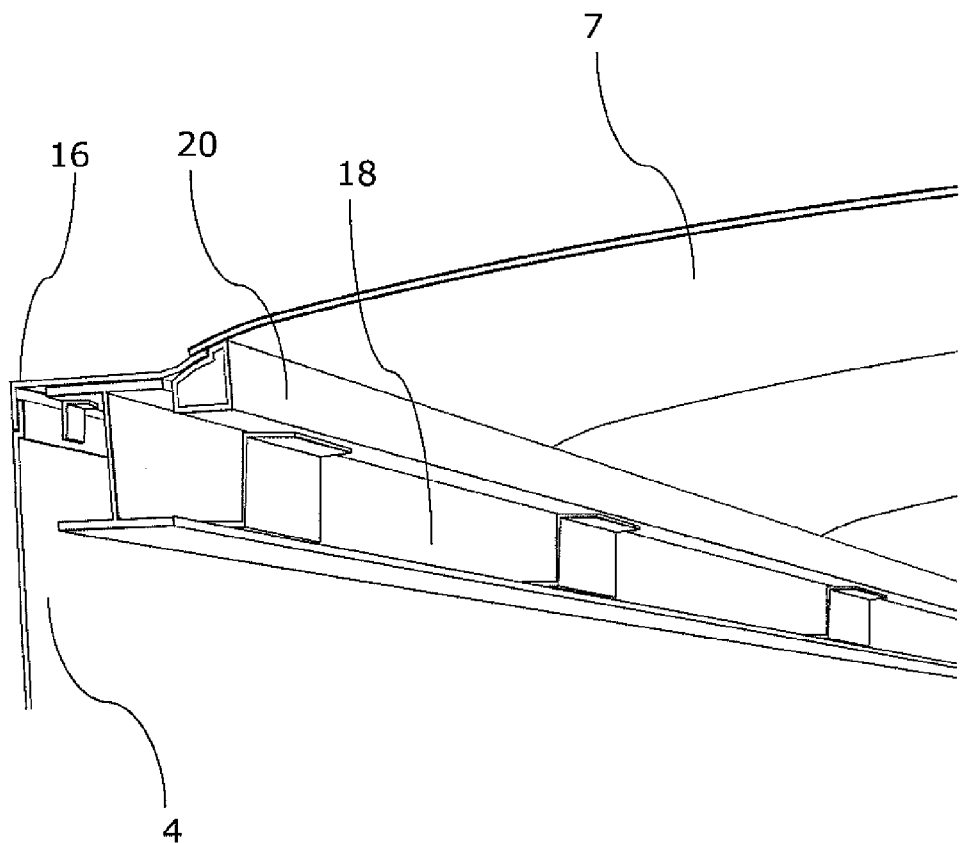
FIG. 5 shows a cross-sectional view of the wind turbine nacelle in its transported position.

In FIG. 5, the top face 7 is arranged in a supported position on a set of support beams 18, such as an I-profile. As can be seen from FIG. 6, the side portion 16 of the transportation kit 11 overlaps the side faces 4 of the bottom part 2 at its outside. Also, the side portion 16 overlaps the top face 7 at the underside of the top face 7. In order to support the top face 7, the transportation kit 11 may further comprise a connection portion 19 serving as a prolongation of the support beam.

Figure 7:
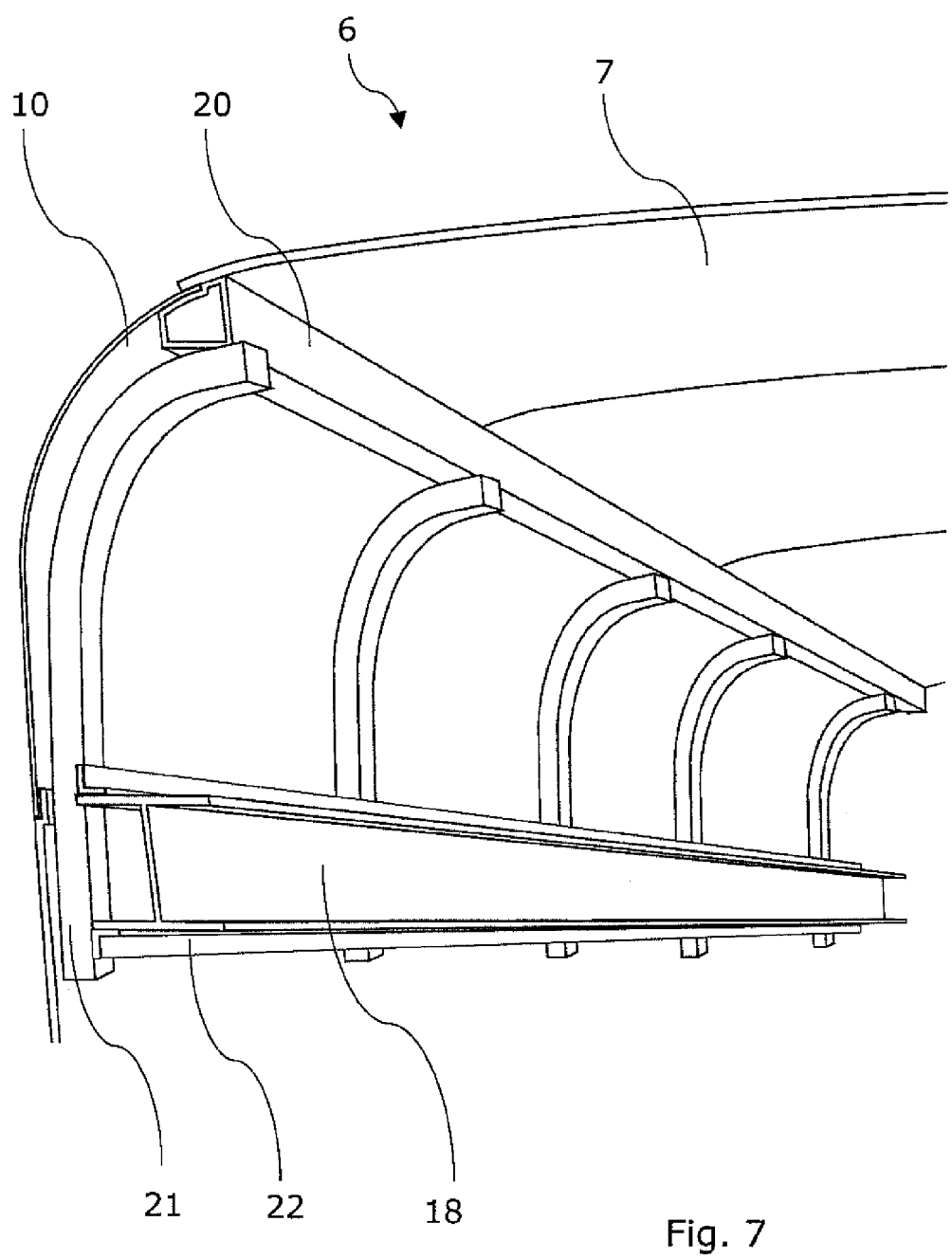
FIG. 7 shows a cross-sectional view of the wind turbine nacelle in its installed position.

FIG. 7 shows the assembled top part 6 from within the space 5 of the nacelle 1. The top face 7 is supported on a connection part 20 which again is supported by rafters 21. The rafters 21 are arranged in supportive connection with the support beam 18 which is supported by the main frame structure 12. Thus, the connection part 20 and the rafters 21 are placed in the inside of the wind turbine nacelle cover 9 and thus not visible from outside the cover.

Figure 8:
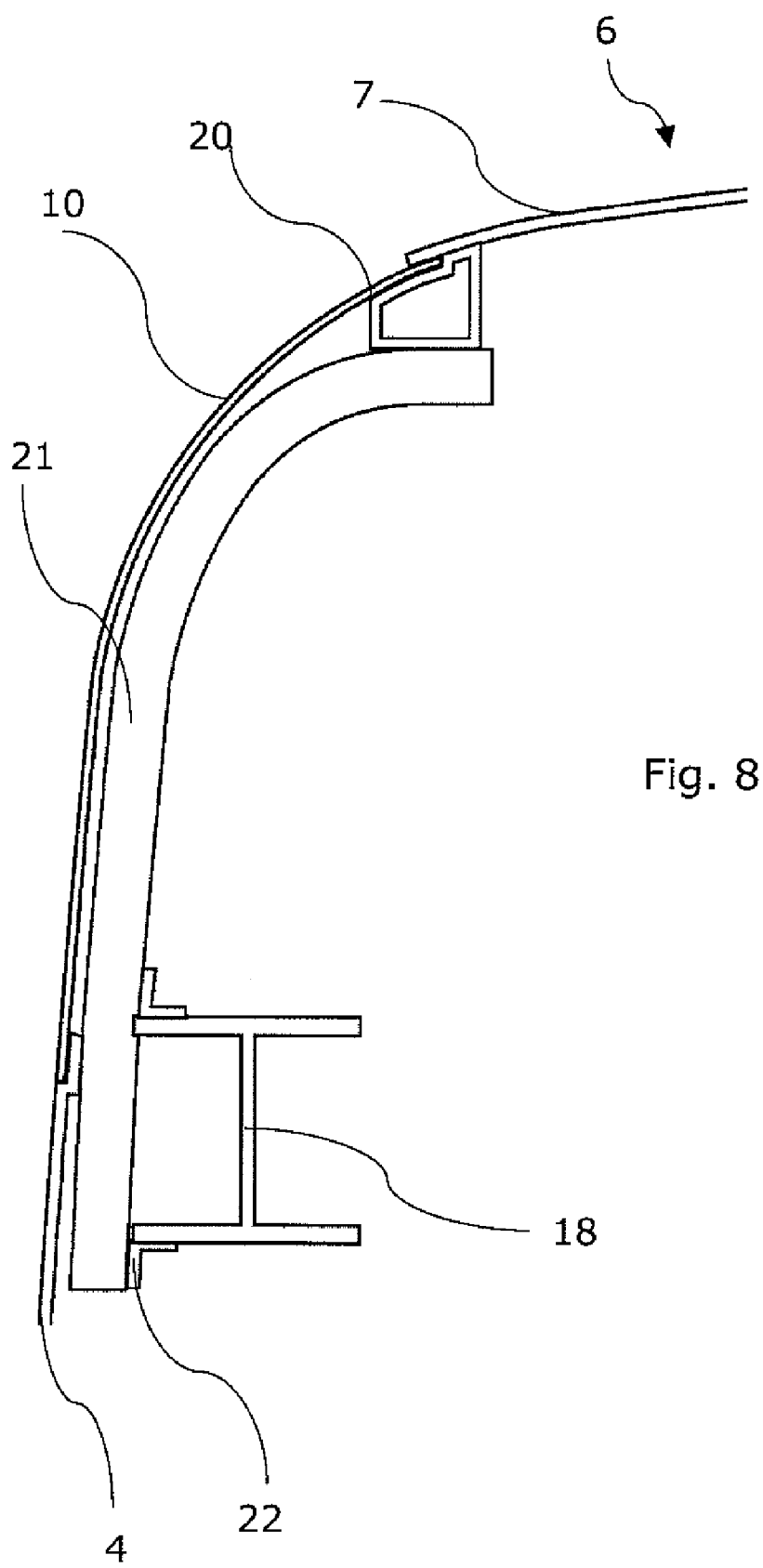
FIG. 8 shows a sectional view of FIG. 7.

As can be seen from FIG. 8, which is a sectional view of FIG. 7, the intermediate part 10 overlaps the side face 4 and the top face 7 so that water can run from the top face along the outside of the intermediate part and further onto the outside of the side face.

Figure 6:
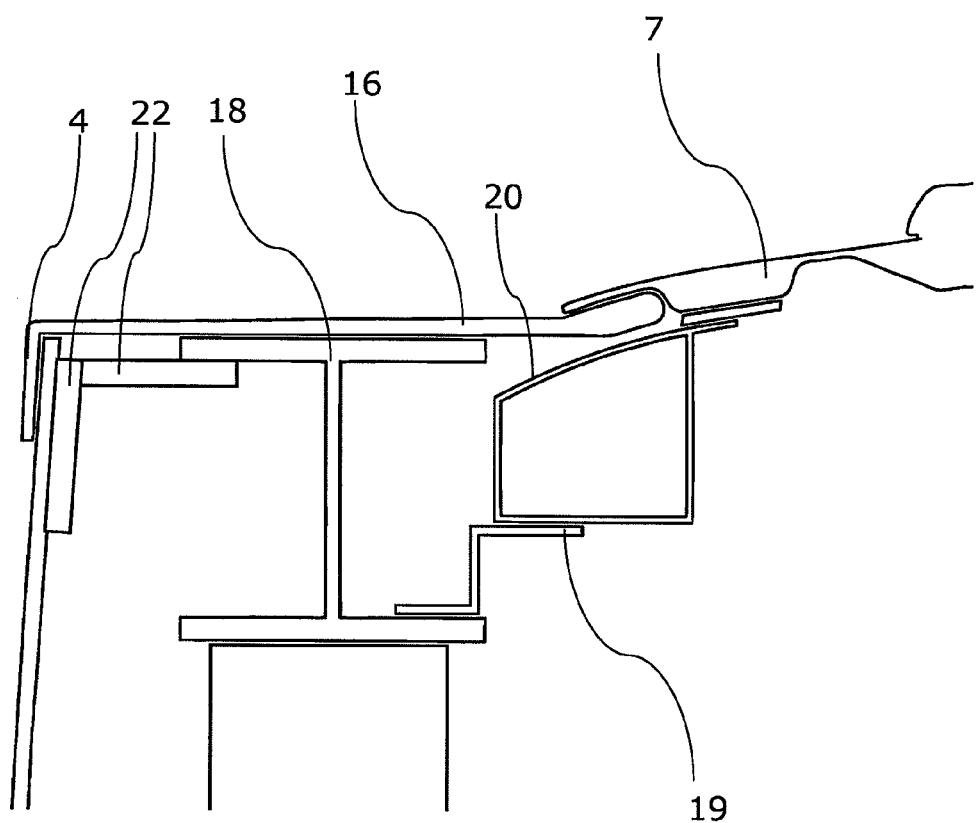
FIG. 6 shows a sectional view of FIG. 5.

When the nacelle 1 of FIG. 7 has been prepared for transport, the rafters 21 and the connection parts 20 are separated from the support beam 18 and placed inside the nacelle. The intermediate parts 10 are also placed inside the space 5 of the nacelle, and the space is closed by arranging the top face 7 as a lid on the support beams 18 as shown in FIG. 6. As can be seen from FIG. 6, the connection part 20 is reused for supporting the side portion 16 of the transportation kit 11 and the top face 7.

Figure 9:
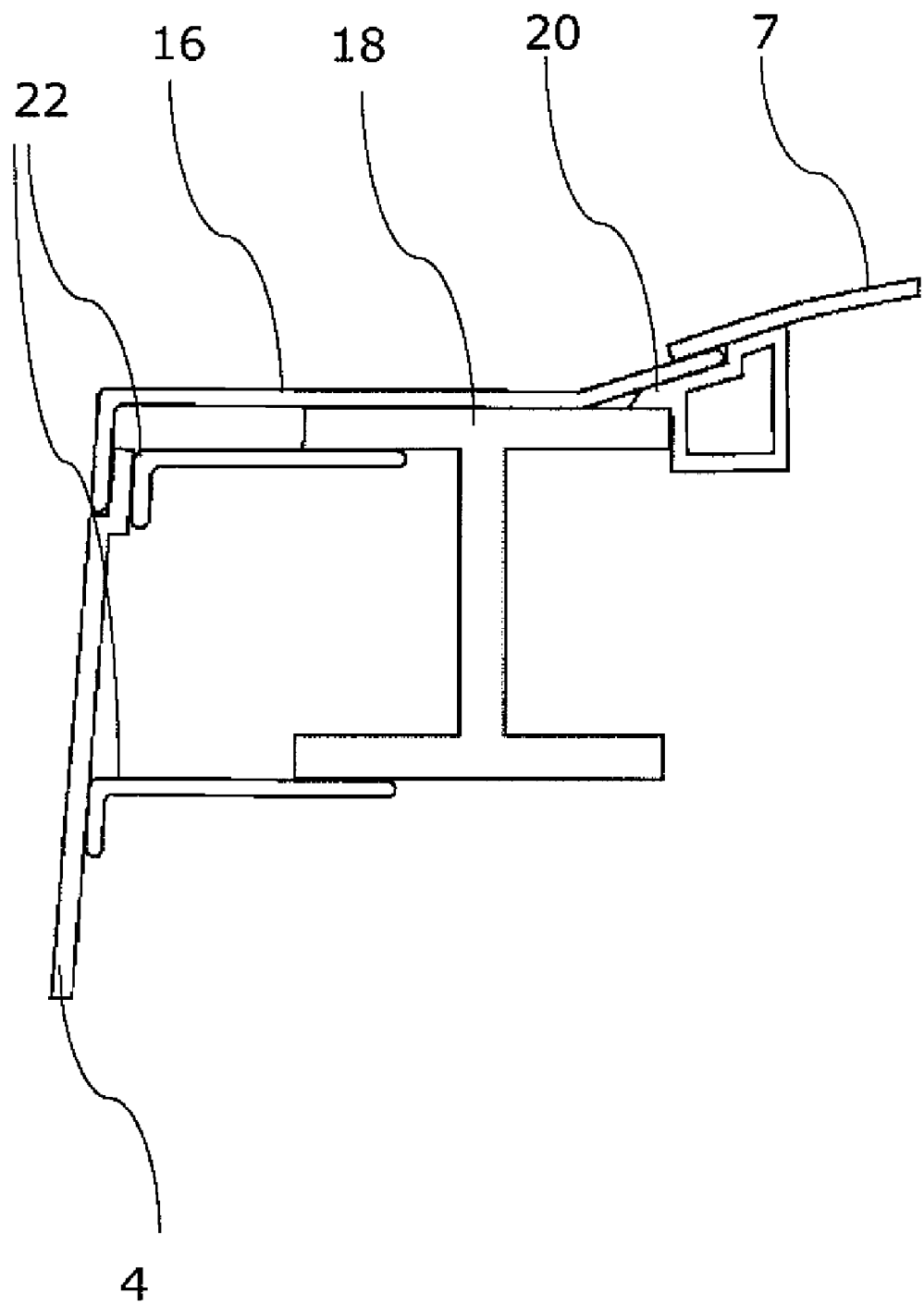
FIG. 9 shows a sectional view of another embodiment of the wind turbine nacelle in its transported position.

Another way of supporting a top face 7 is shown in FIG. 9, in which the connection part 20 is also reused. However, no additional connection portions 19 are needed since the connection part 20 is supported directly on the support beam 18 for supporting the side face 16 of the transportation kit 11 and the top face 7.

In one embodiment, the installation height h1 of the wind turbine nacelle 1 of FIG. 7 may be 3.9 meters whereas the height h2 of the nacelle in the corresponding transported position, shown in FIG. 5, is approximately 3.3 meters. In this way, the height of the nacelle 1 can be reduced 60 centimeters, which is enough for it to be allowed to be transported on one truck bed instead of two. Hereby, the transportation cost is reduced since two separate trucks are no longer needed. Furthermore, by reusing the transportation parts 13, the present invention becomes even more cost-saving and environment-friendly.

Figure 10:
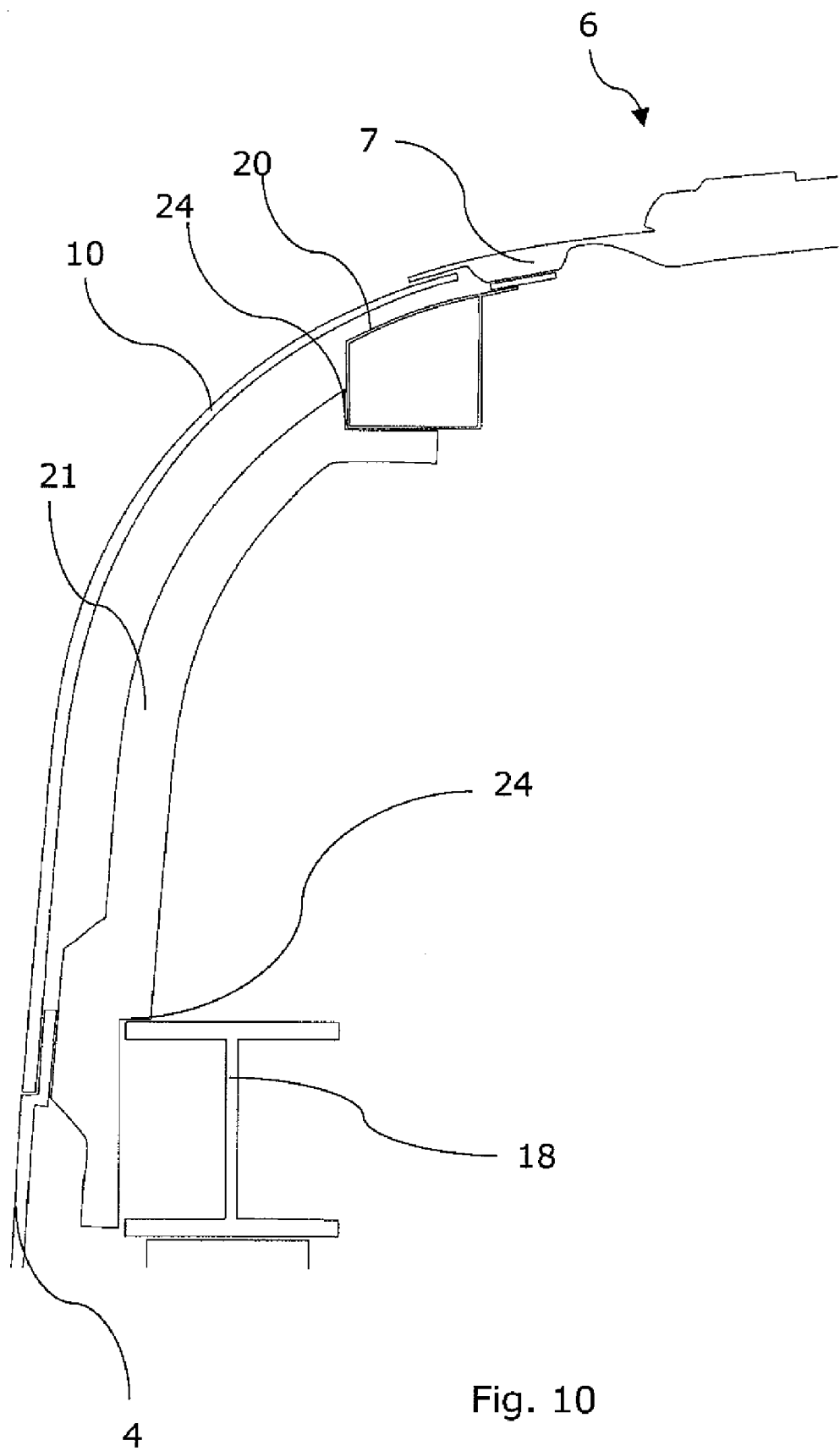
FIG. 10 shows a sectional view of yet another embodiment of the wind turbine nacelle in its installed position.

The rafters 21 may have all sorts of designs depending on the complexity and the design of the nacelle 1. In FIG. 10, the rafter 21 is shown having an indentation 24 in one end where it rests on the support beam 18. When having such an indentation 24, no additional fittings 22, such as those shown in FIG. 8, are needed. In addition, the rafter 21 may, in its other end, have an indention for supporting the connection part 20, making the construction more reliable. In this embodiment, the support beam 18 rests directly on the main frame structure 12.

Figure 11:
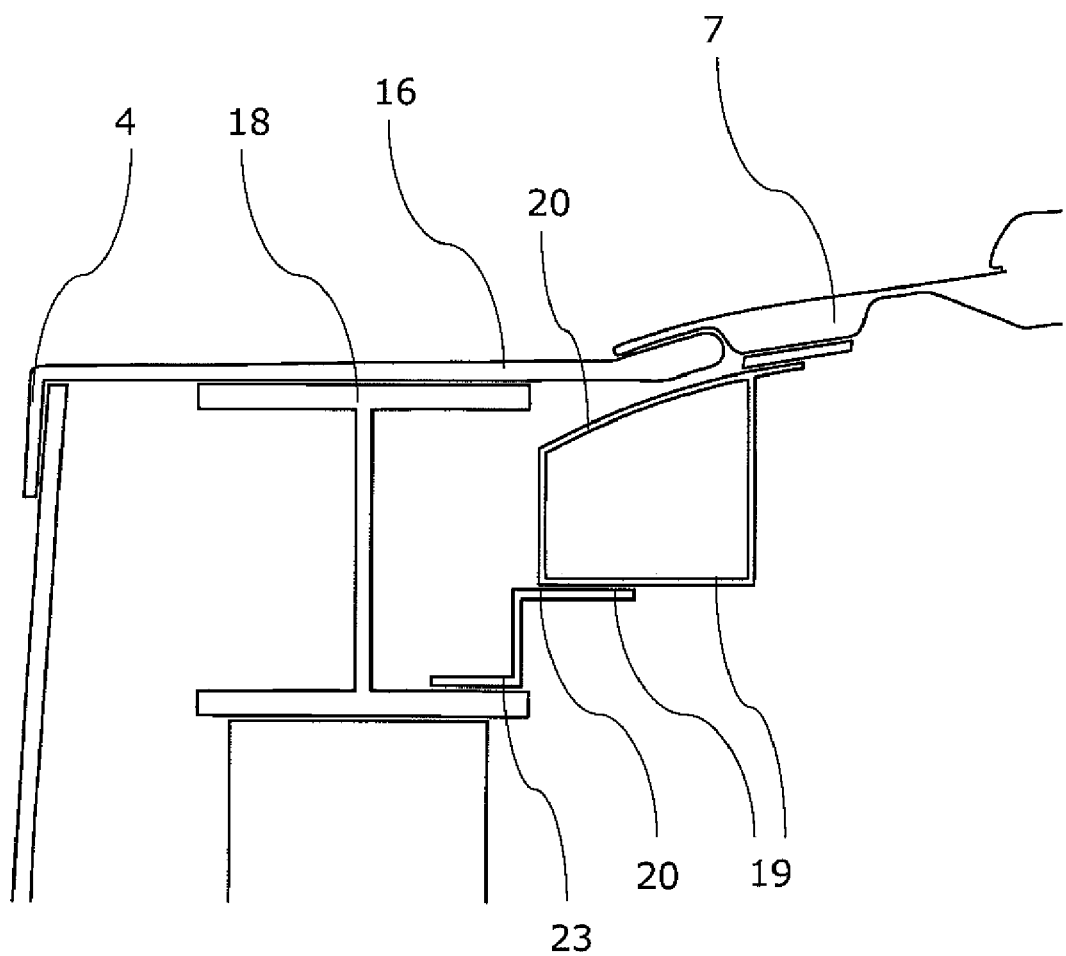
FIG. 11 shows a cross-sectional view of the wind turbine nacelle of FIG. 10 in its transported position.

In FIG. 11, yet another embodiment of the nacelle 1 is shown in its transported position. In this embodiment, the top face 7 rests on the side portions 16 of the kit 11. To support the side portion 16, a connection part 20 is connected to the support beam 18 through a bracket 23. The support beam 18 is arranged on top of the main frame structure 12. Furthermore, the top face 7 has a cross-sectional profile enabling the top face to be dismounted both from the outside and the inside of the wind turbine nacelle 1.

The transportation parts 13 may have sealing means. However, if the top face 7 overlaps the transportation parts 13, which again overlap the side faces 4 or other transportation parts, and so forth as shown in FIG. 11, a sealing connection is provided since water runs from the top face down onto the transportation part and further onto the side face or an additional transportation part.

Figure 12:
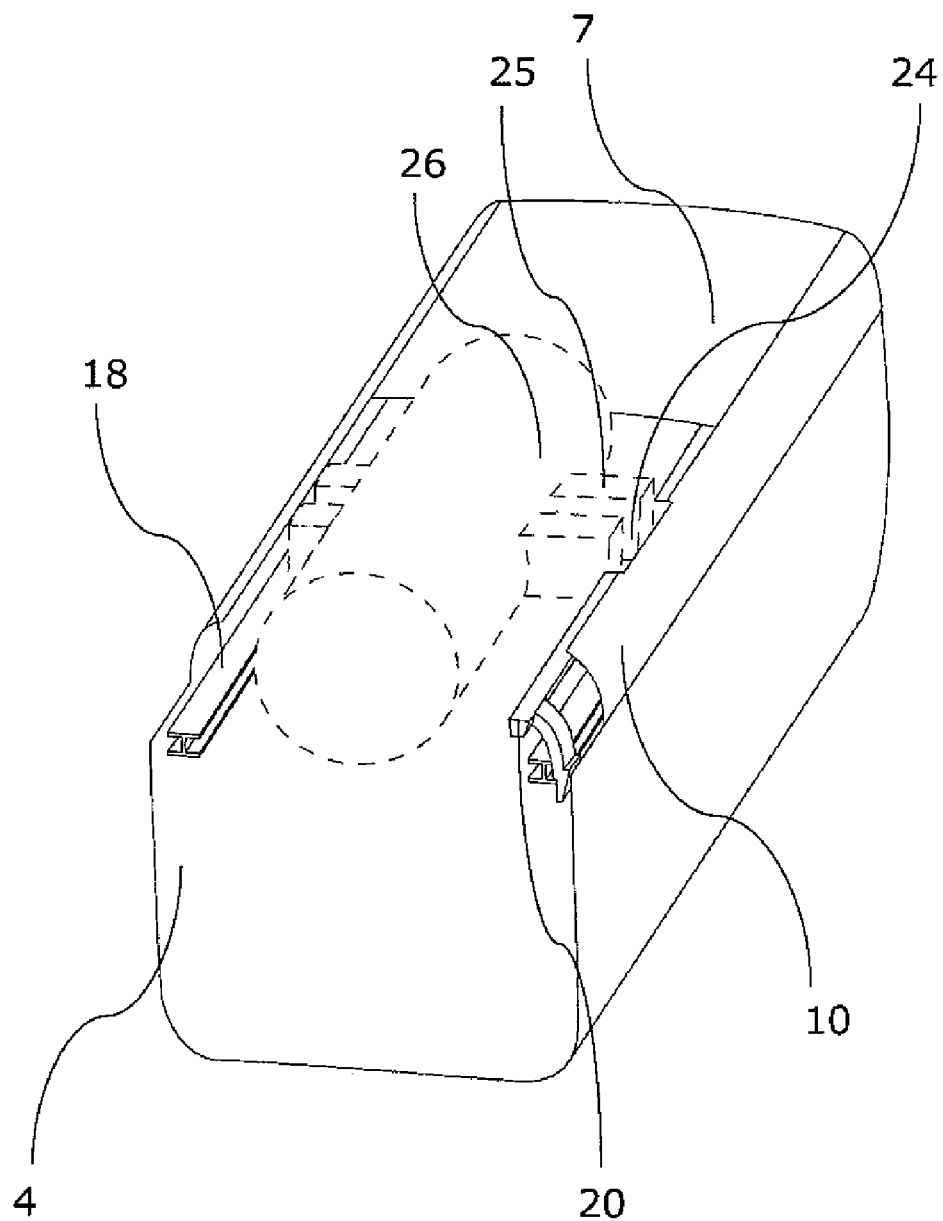
FIG. 12 shows a partly sectional view of the wind turbine nacelle.

When the wind turbine nacelle 1 is in its installed position, the connection part 20 for supporting the top face 7 may hinder parts of the drive train 26 from being removed in order to perform repair or maintenance work. Thus, the connection part 20 may be provided with indentations or made as separate parts along the length of the top face 7, thus making it possible to take out either parts of the drive train or the entire drive train 26. This is illustrated in FIG. 12, in which mountings 25 of the drive train can easily pass through the indentation of the connection part 20.

Figure 13:
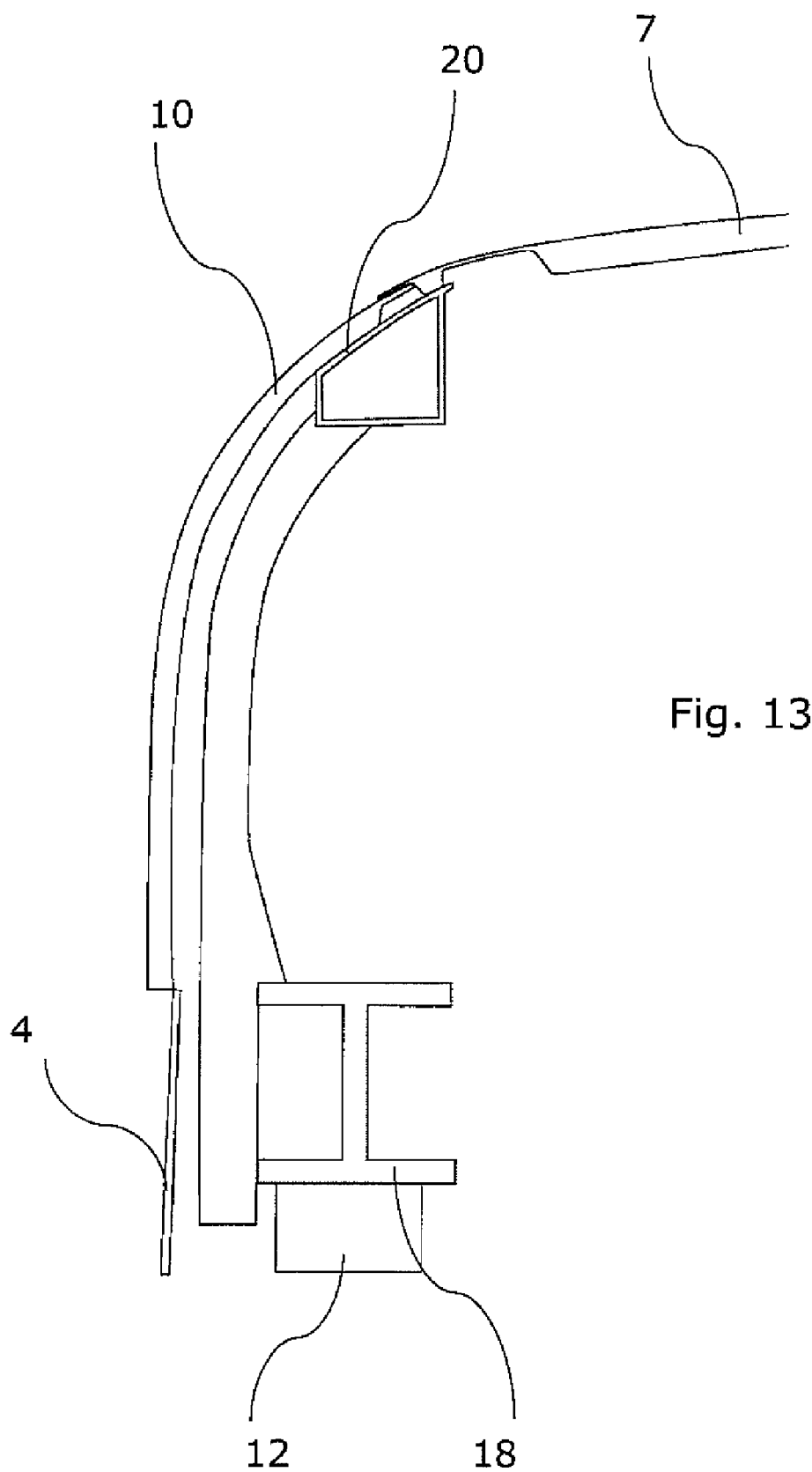
FIG. 13 shows a cross-sectional view of yet another embodiment of the wind turbine nacelle in its installed position.
Figure 14:
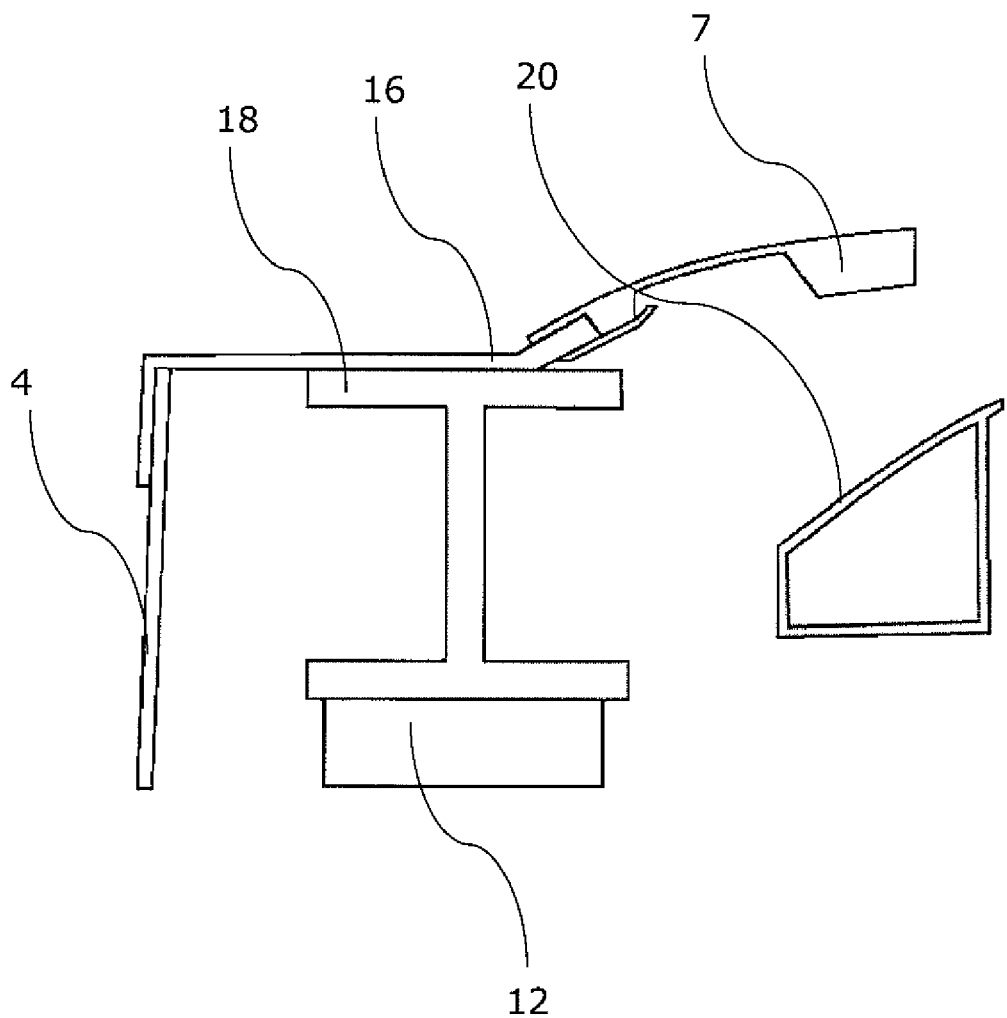
FIG. 14 shows a sectional view of the wind turbine nacelle of FIG. 13 in its transported position.

In FIG. 13, the top part 6 is dividable into three parts, i.e. a top face 7 and two intermediate parts 10. The intermediate parts 10 abut the side faces 4 of the bottom part 2 and are held in place between the top face 7 and a connection part 20 which may be some kind of profile, such as an H-profile, I-profile, etc. The connection part 20 is supported by rafters 21. In its transported position, as shown in FIG. 14, a transportation part 13, 16 is supported directly on the support beam 18 for supporting the top face 7 and overlapping the side face 4 of the bottom part 2. In this embodiment of the nacelle 1 in its transported position, the connection part 20 is not reused as a support part, but is merely positioned inside the space 5 of the nacelle.

Figure 15A:
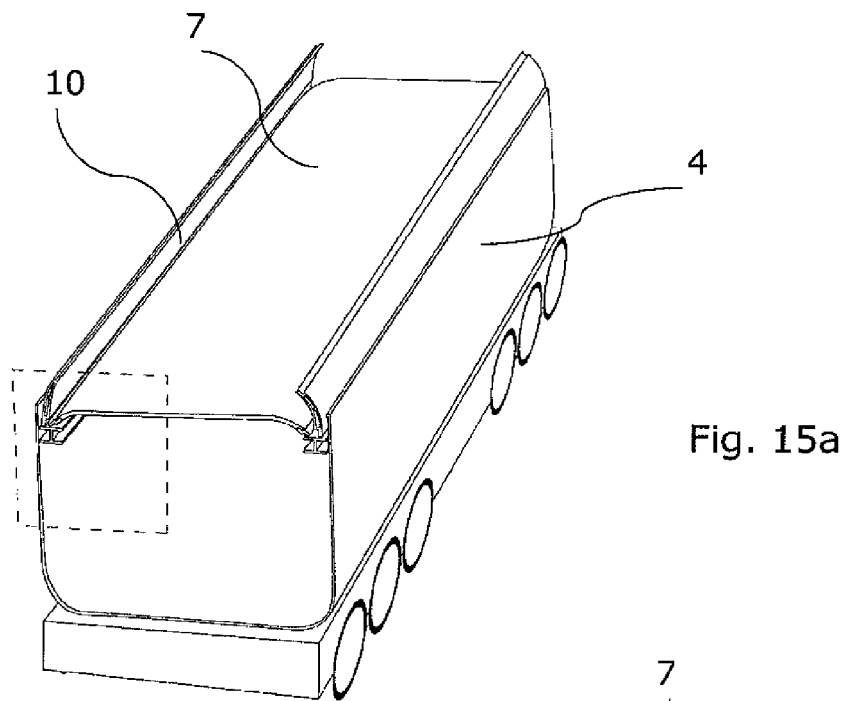
FIG. 15a shows another embodiment of the nacelle in its alternative transported position.
Figure 15B:
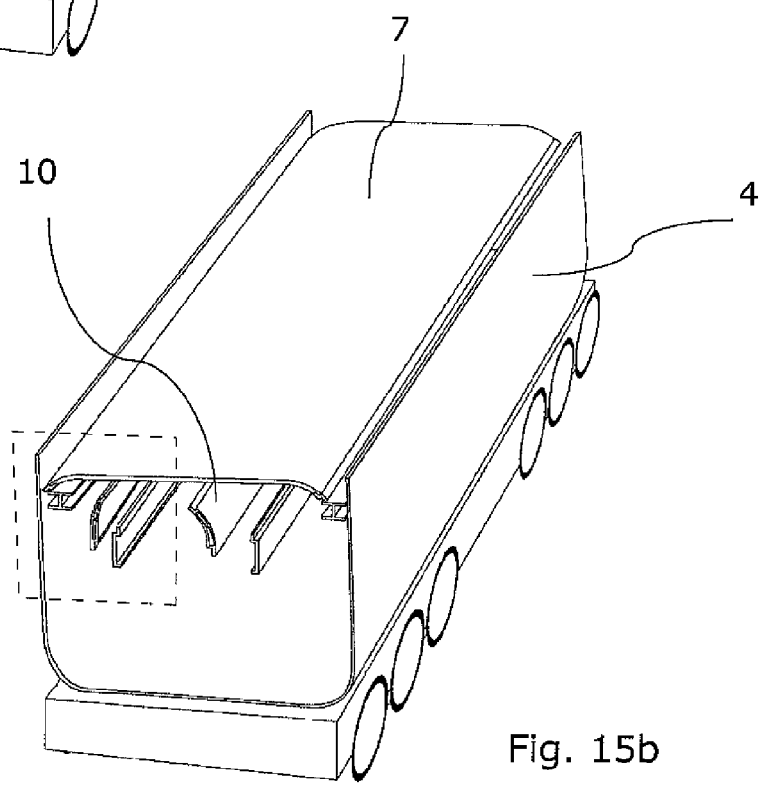
FIG. 15b shows yet another embodiment of the nacelle in its alternative transported position.
Figure 16:
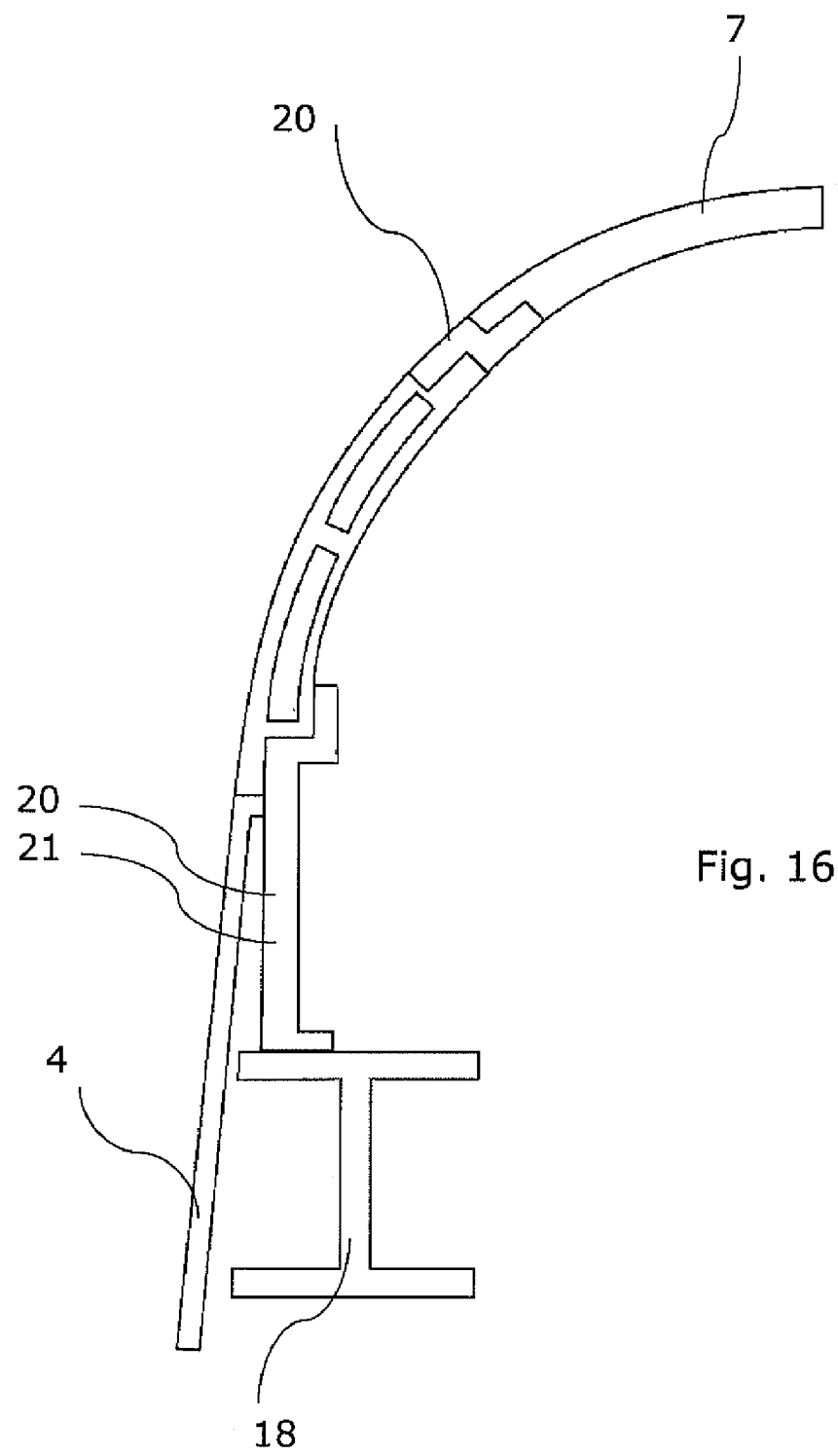
FIG. 16 shows a cross-sectional view of FIG. 15a or 15b through the middle section of the nacelle in its installed position.
Figure 17:
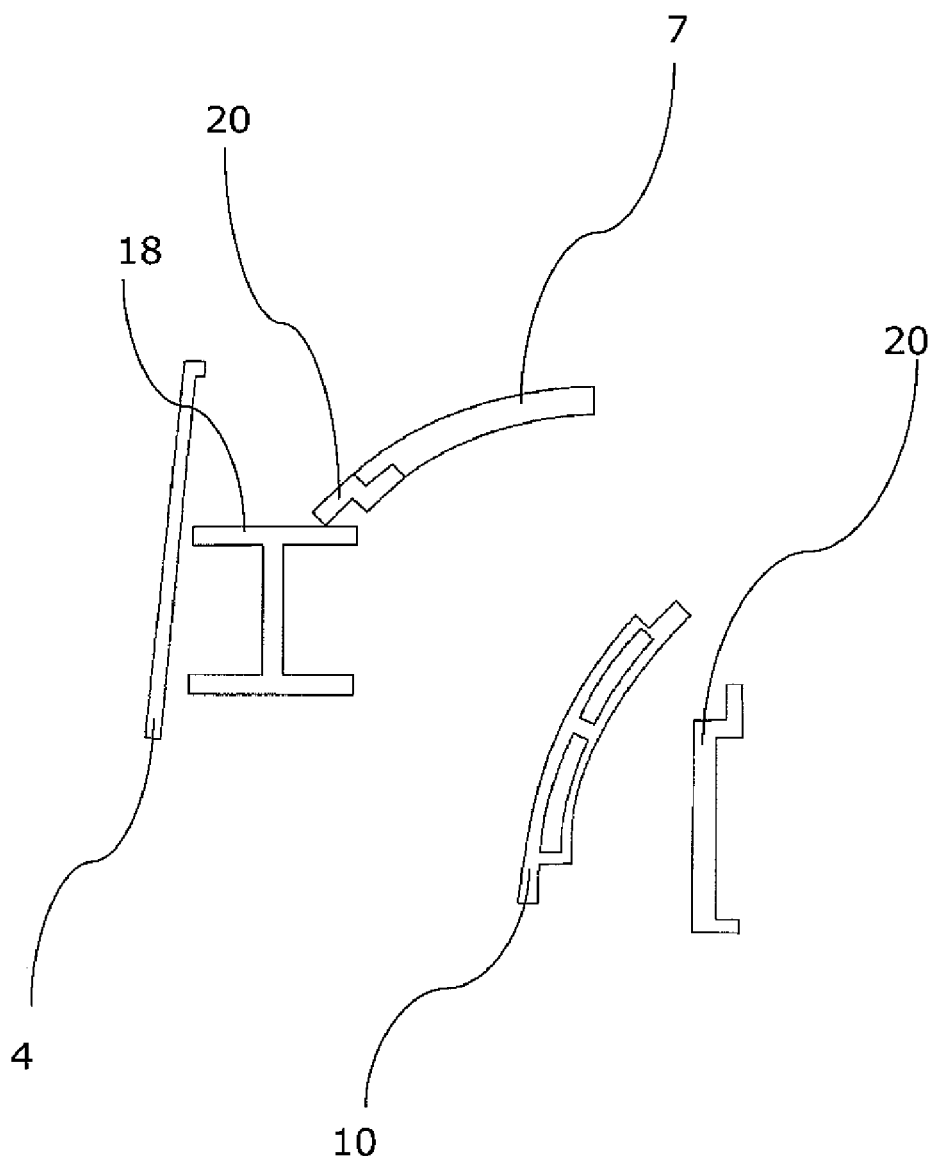
FIG. 17 shows a cross-sectional view of FIG. 15b through the middle section of the nacelle in its alternative transported position.

The top part 6 may be separated into three parts when transported, as shown in FIGS. 15a and 15b. The intermediate parts 10 are either placed either outside the top face 7 and are also supported by the support beam 18 as shown in FIG. 15a, or the parts may be placed inside the nacelle 1 as shown in FIG. 15b. The intermediate parts 10 may have a variety of designs. In FIG. 16, the intermediate part 10 is shown as a frame structure made of elongated sheets. The top face 7 is connected with a connection part 20, which is a fixed part of the top face and may be made from a sealing and/or flexible material. Thus, the top face 7 has a sealing connection to the support beam 18 when the top face is supported by the support beam, as shown in FIG. 17. Thus, rain and other precipitation will flow from the outside of the top face 7 and along the support beam 18 to the ends of the support beams. If a transportation kit 11 is used, the top face 7 may make a sealing connection to the transportation parts 13 of the kit.

In order to uphold the intermediate parts 10 and thus the top face 7, the nacelle 1 comprises a connection part 20 in the form of rafters 21 or beams 18. The rafters 21 or beams 18 have indentations to provide a reliable connection to the intermediate parts 10.

Figure 18:
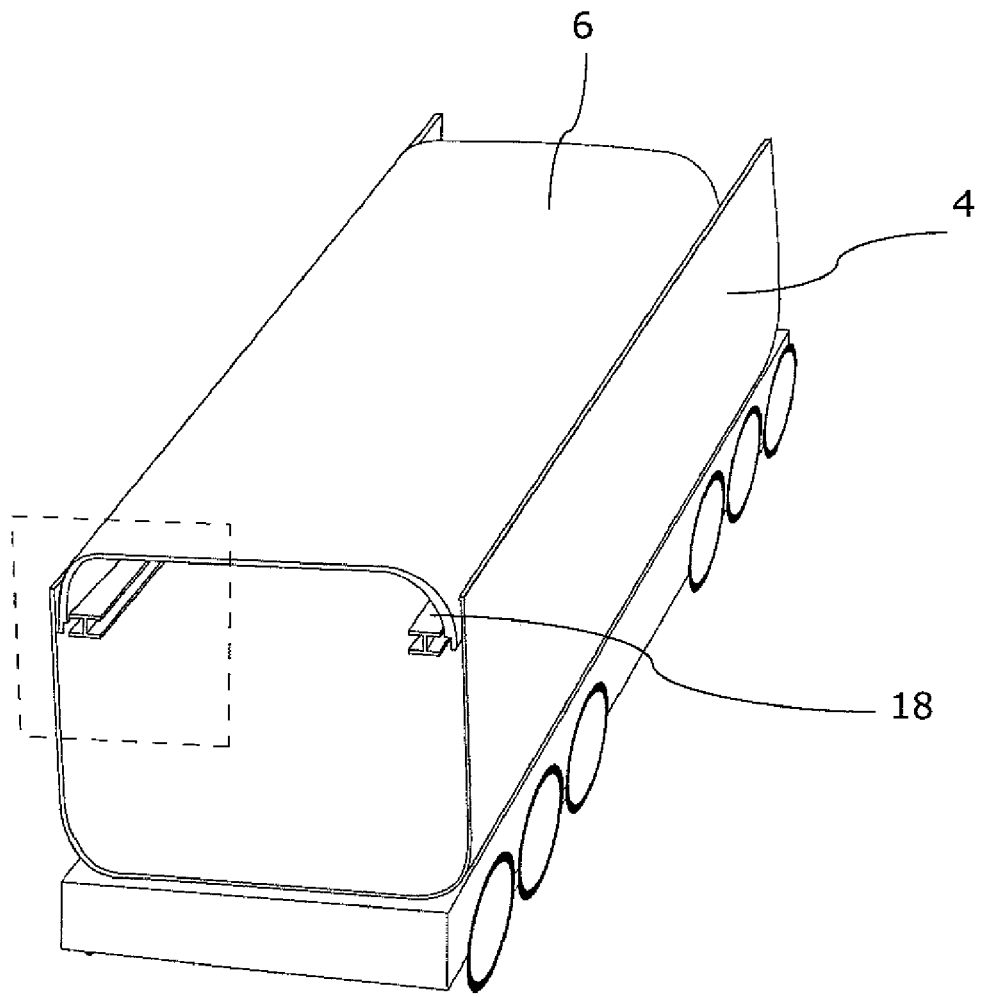
FIG. 18 shows another embodiment of the wind turbine nacelle in its transported position.
Figure 20:
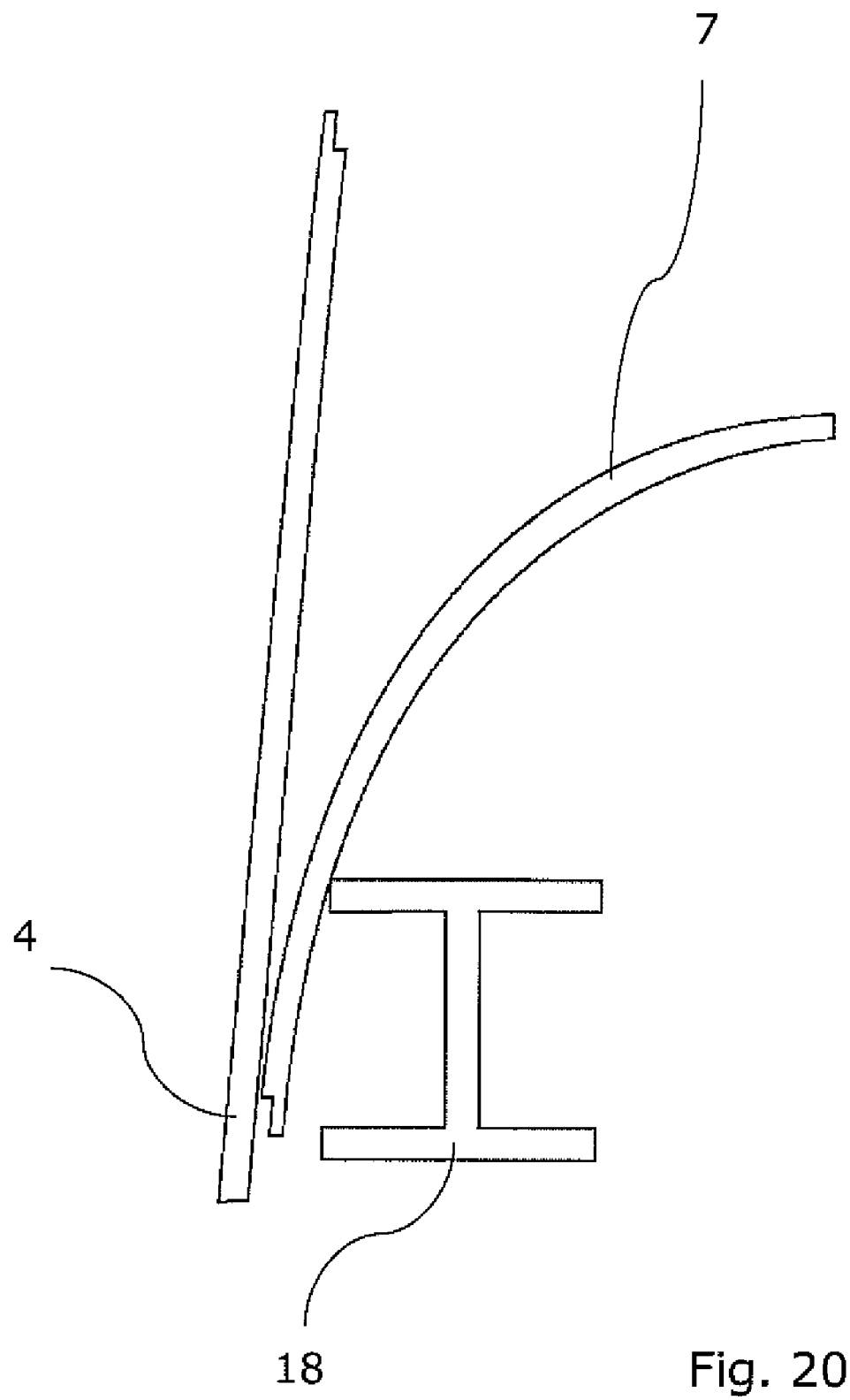
FIG. 20 shows a cross-sectional view of FIG. 18.

As mentioned and as is illustrated in FIGS. 18 and 20, the top face 7 may also be one part which is placed in between the side faces 4 of the bottom part 2, squeezing the top part in between the side faces and thus somewhat increasing the width of the bottom part.

Figure 19:
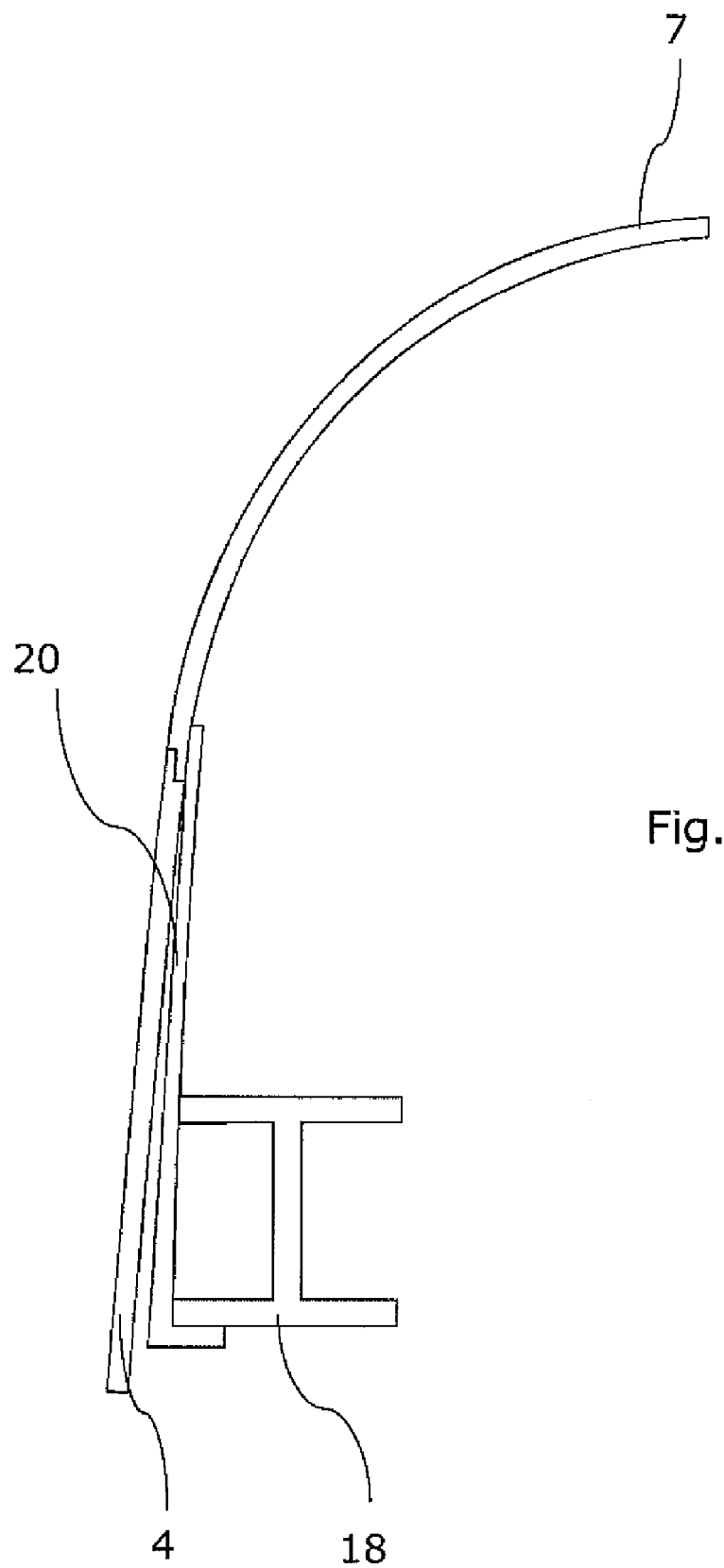
FIG. 19 shows a cross-sectional view of FIG. 18 through the middle section of the nacelle in its transported position.

In the installed position of the wind turbine nacelle 1, rafters 21 or connection parts 20 are placed intermediate the support beam 18 and the top part 6 in order to support the top part as shown in FIG. 19. In the transported position of the nacelle 1, the top face 7 is supported directly on the support beam 18 as illustrated in FIG. 20.

Figure 21:
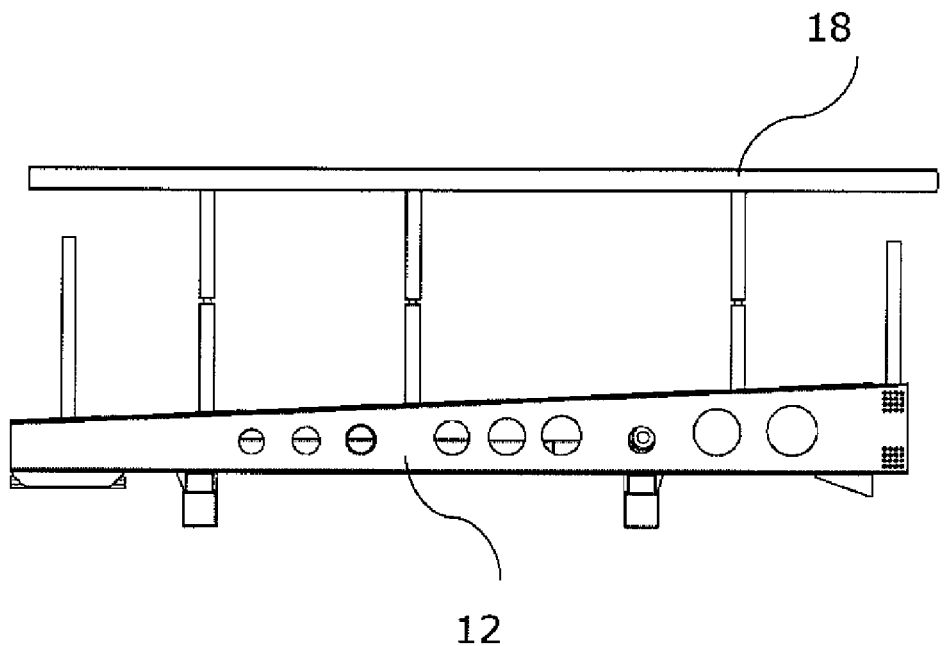
FIG. 21 shows a sectional view of the main frame structure of the invention.
Figure 22:
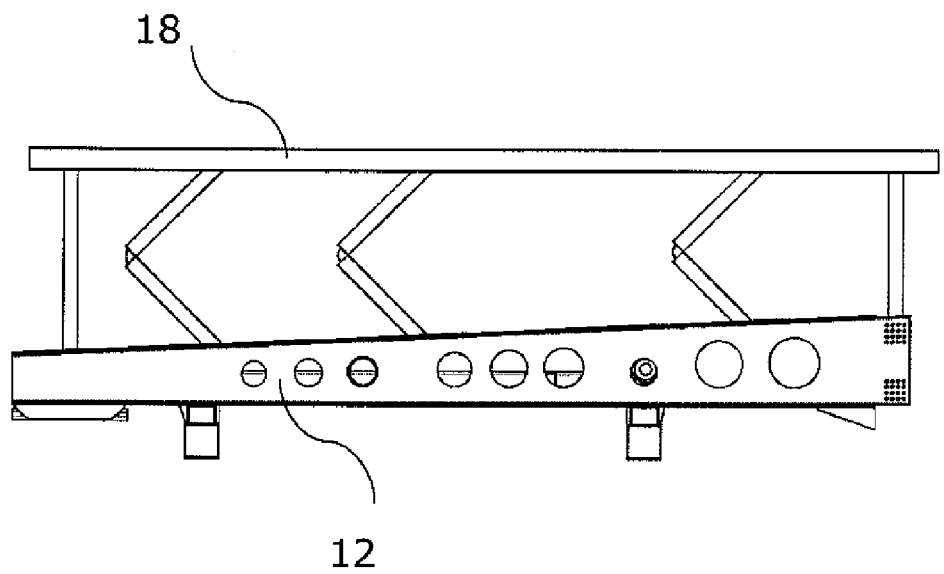
FIG. 22 shows the structure of FIG. 21 in its folded position.

In one embodiment, part of the main frame structure 12 is foldable as shown in FIGS. 21 and 22. In this way, the height of nacelle 1 can be reduced even further if necessary.

In addition, the top part 6 may be dividable into two parts which is separated when preparing the nacelle 1 for transport. The top part 6 is separated along the middle of the top part in the longitudinal extension. The top part 6 may be separated along its centre line or along a line displaced from its centre line, thus either separating it into two equally sized parts or separating it into two parts of different sizes. The design of the top part 6 depends on the construction of the drive train 26 so that the two parts are supported directly or indirectly in a simple manner in relation to the drive train.

Figure 23:
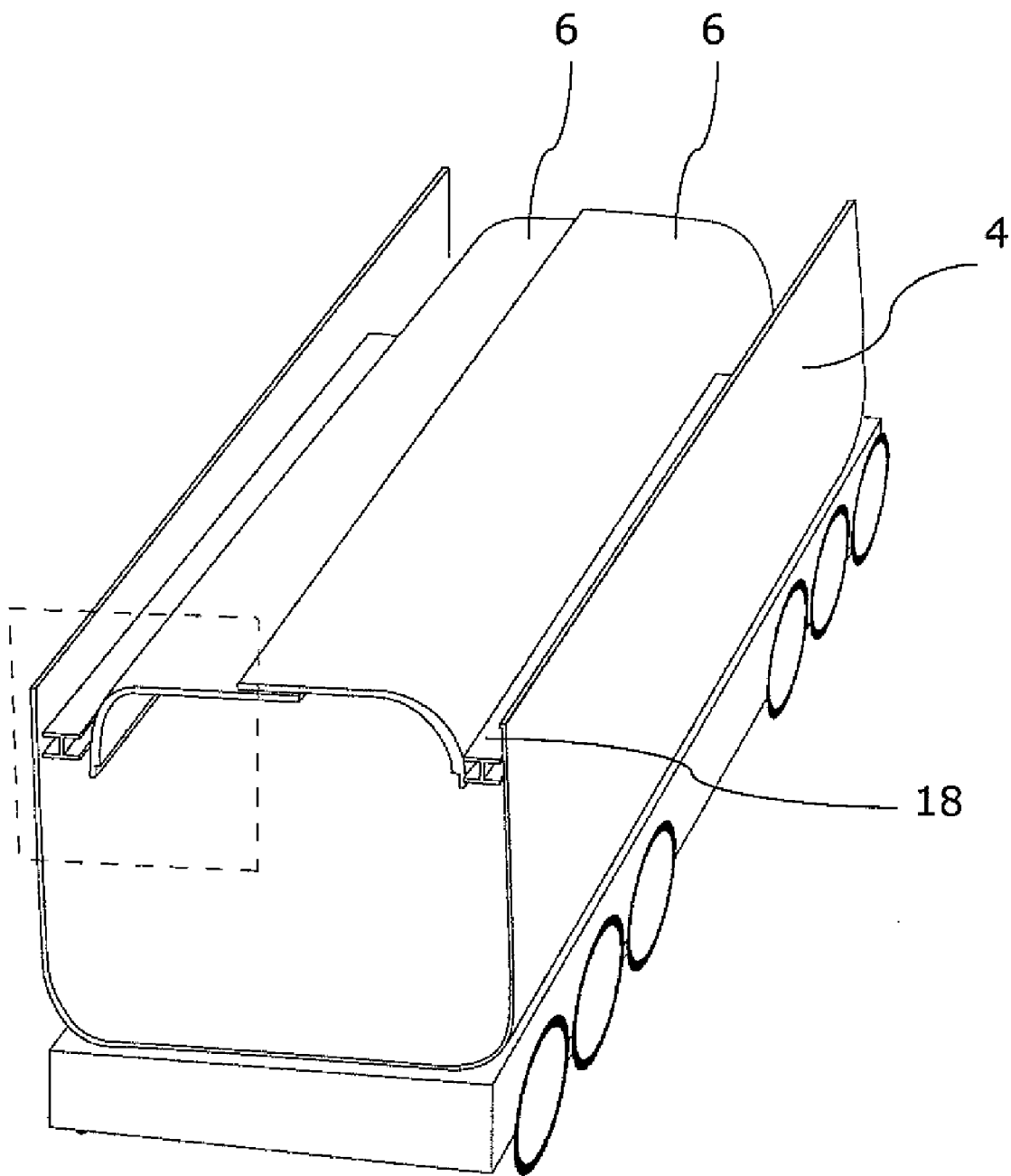
FIG. 23 shows another embodiment of the wind turbine nacelle in its transported position.
Figure 24:
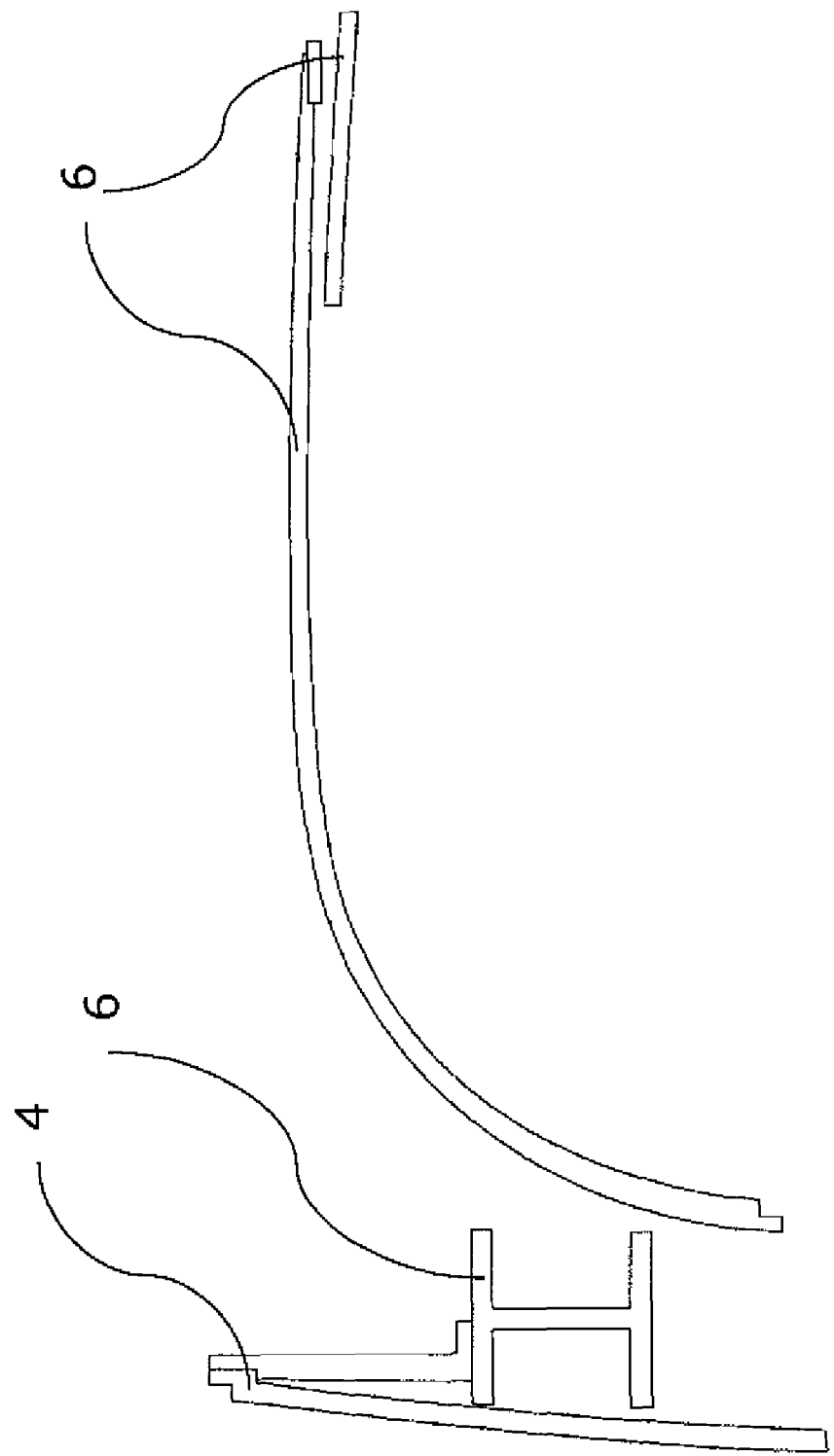
FIG. 24 shows a cross-sectional view of FIG. 23.

In FIG. 23, the top part 6 is separated into two equal parts and arranged in an overlapping position so that the parts can be placed easily within the space 5 of the bottom part 2. In FIG. 24, the two top parts are supported by the main frame structure 12 using some kind of connection parts 20 (not shown) and the two parts overlap each other at the top. In the transported position, the top parts may be supported by the support beam 18.

Figure 25:
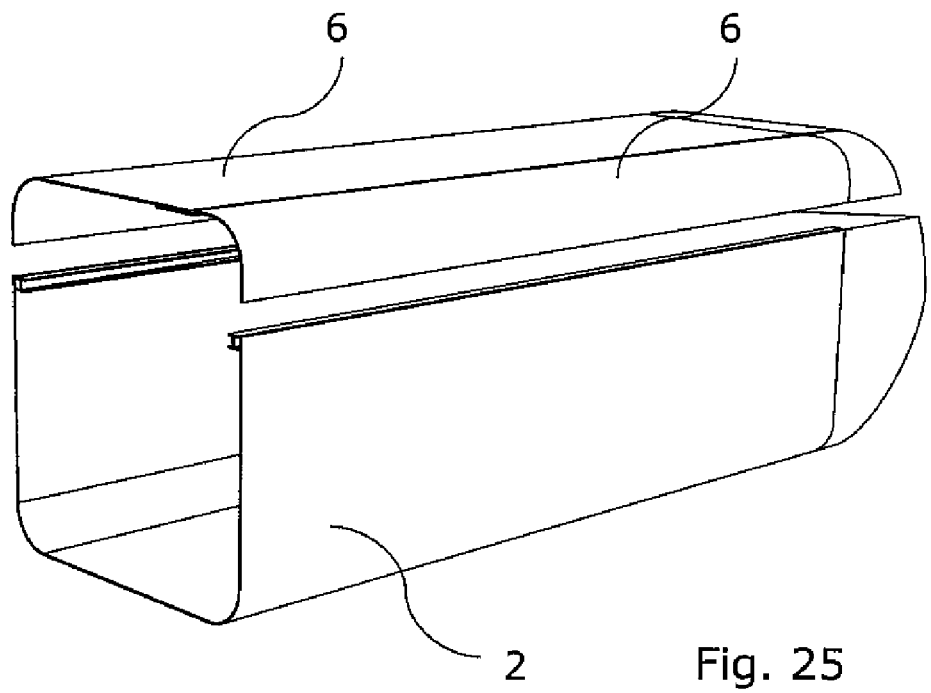
FIG. 25 shows another embodiment of the wind turbine nacelle in perspective.
Figure 26:
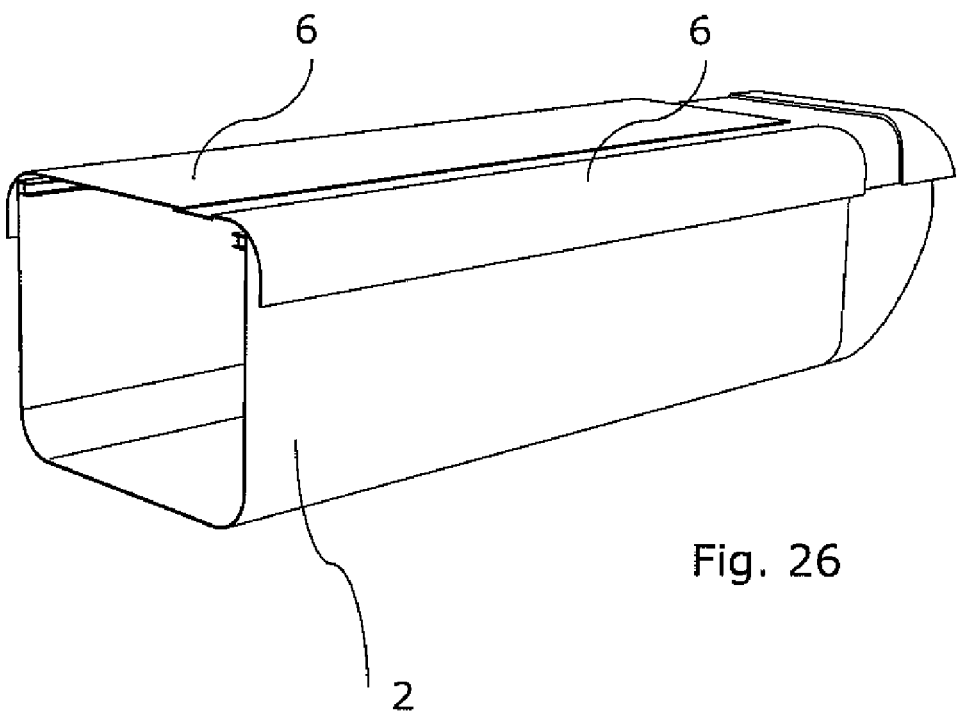
FIG. 26 shows the nacelle of FIG. 25 in its transported position.

In FIG. 25, the top part 6 is separated into two differently sized parts. As can be seen in FIG. 25, the top part 6 is separated into two parts and arranged so as to extend outside of the width w of the bottom part 2 so that part of the top parts overlaps the side face 4, as shown in FIG. 26.

Figure 27:
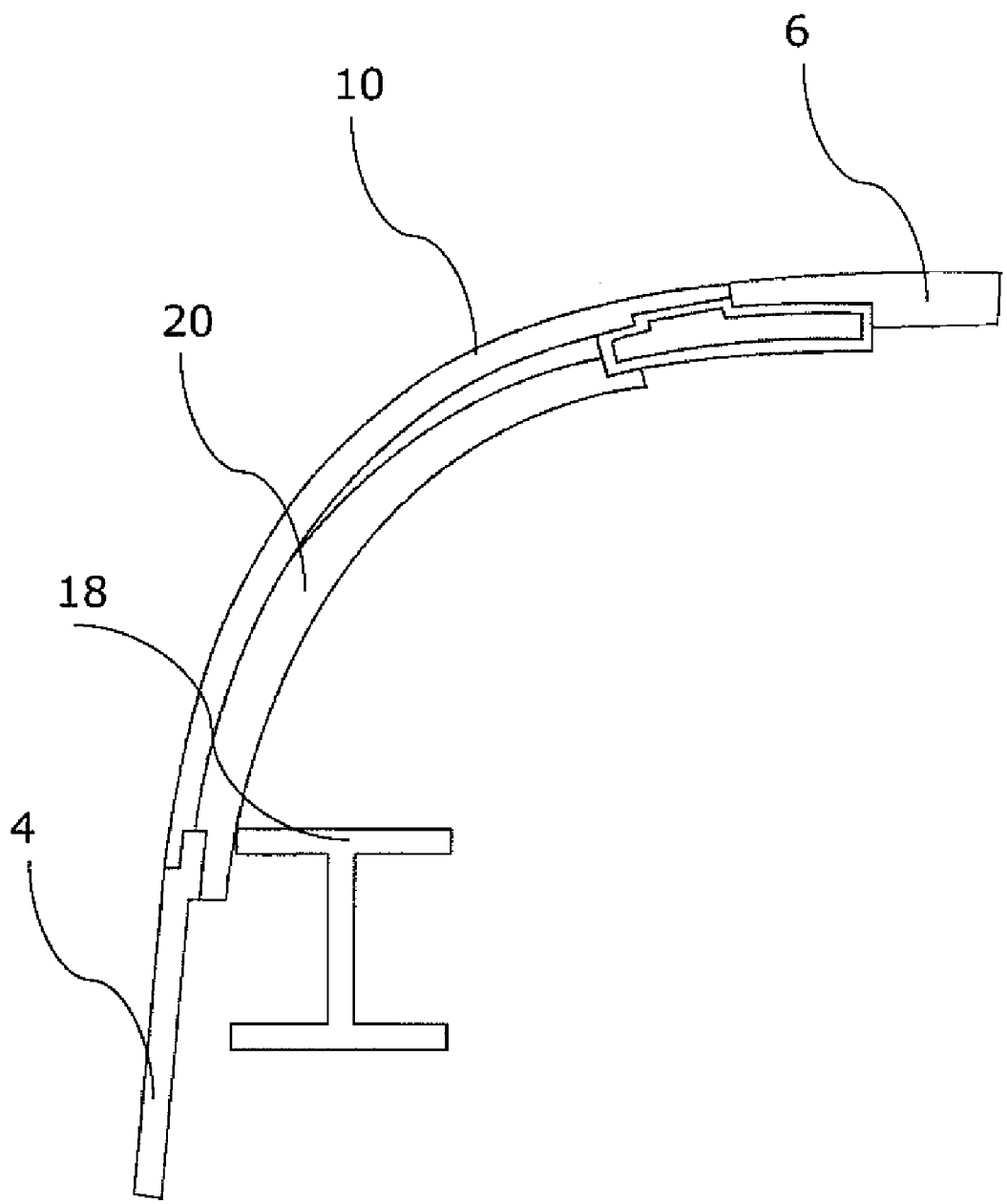
FIG. 27 shows a cross-sectional view of the nacelle of FIG. 25 in its installed position.
Figure 28:
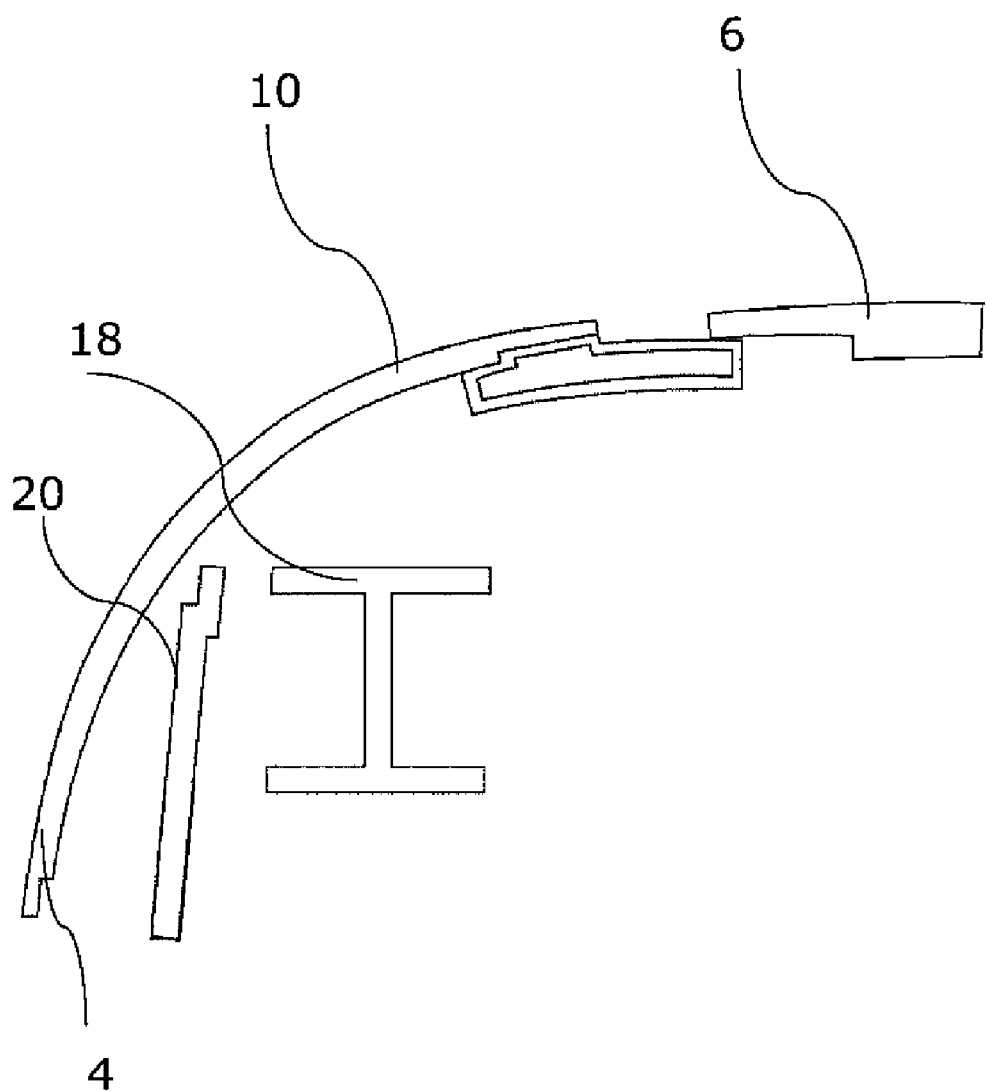
FIG. 28 shows a cross-sectional view of the nacelle of FIG. 25 in its transported position.

In another embodiment, the intermediate parts 10 of the top part 6 overlap the top face 7 in the installed position as shown in FIG. 27. When the nacelle 1 is prepared for transport, the intermediate parts 10 are pulled outwards towards the side faces 4 so that the intermediate parts extend over and overlap the outside of the side faces 4. In this overlapping position, the intermediate parts 10 still overlap the top face 7 and are supported on the support beam 18. Thus, the overlap between the top face 7 and the intermediate part 10 in FIG. 27 is larger than the overlap between the top face and the intermediate part in FIG. 28. The rafter 21 shown in FIG. 27 is positioned inside the space 5 when the nacelle 1 is transported. Thus, one part may overlap a predetermined part of another part.

Figure 29:
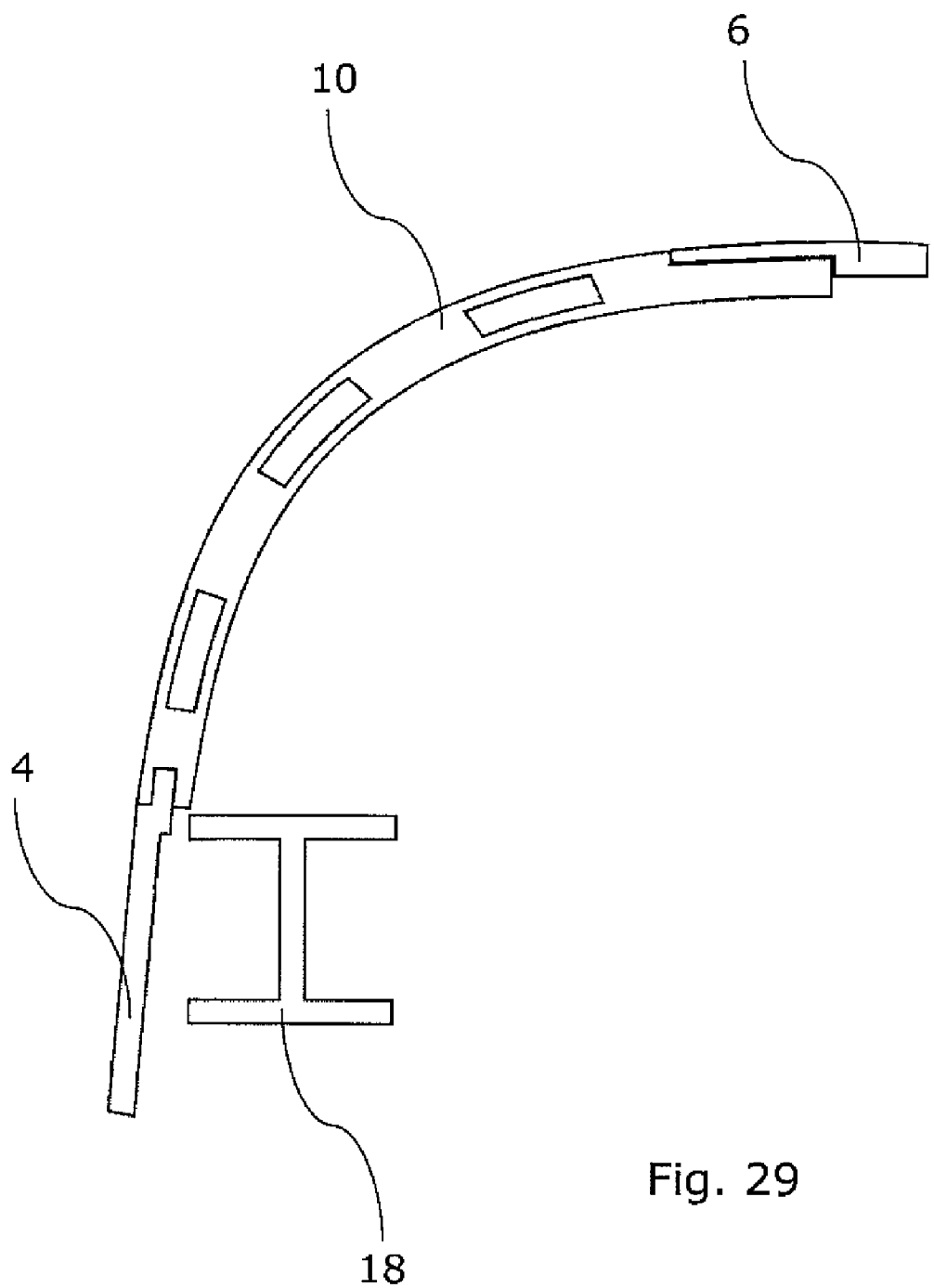
FIG. 29 shows a cross-sectional view of another embodiment of the nacelle in its installed position.
Figure 30:
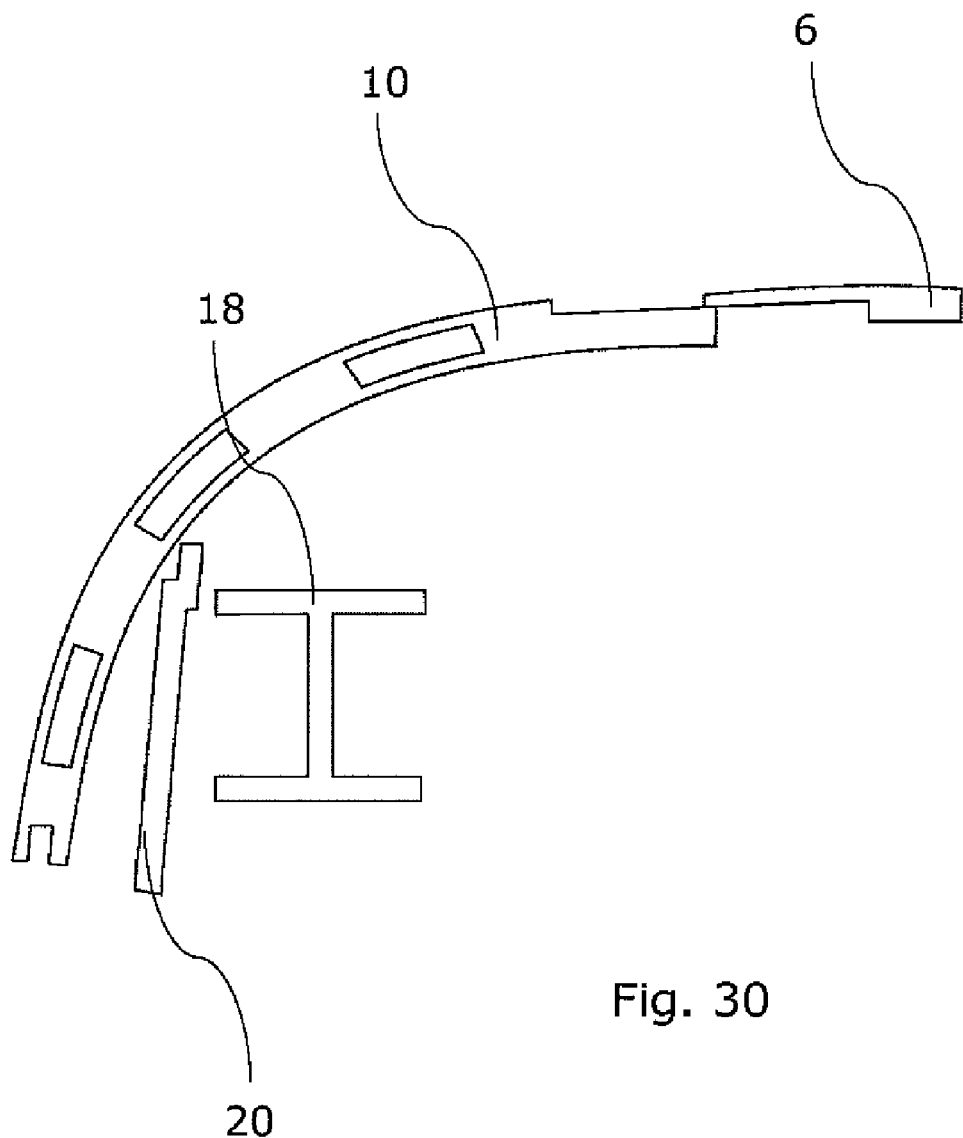
FIG. 30 shows a cross-sectional view of the nacelle of FIG. 29 in its transported position.

In FIGS. 29 and 30, the intermediate part 10 and the rafter 21 of FIG. 27 have been constructed as one part so that the intermediate part 10 both has the strength of the rafter and also serves as the cover 9 of the wind turbine nacelle 1. The intermediate part 10 overlaps a predetermined part of the top face 7 in FIG. 29, which predetermined part is decreased in the corresponding transported position of FIG. 30. The intermediate part 10 is supported by the support beam 18, which also serves as rails for the travelling crane. When the top part 6 is divided into two overlapping parts as in FIGS. 27-30, a simple design of the nacelle 1 is provided since the construction does not have a lot of different additional supporting and/or connecting parts. In this way, no additional parts are needed for changing the nacelle 1 from its transported position to its installed position, and vice versa. The intermediate part 10 may constitute an additional expense; however, no expenses will be needed for any additional parts.

In another embodiment, the rafters 21 may be adjustable in height in order to minimise the height of the nacelle 1 during transport as shown in FIGS. 31 and 32. Some of the rafters 21 may have a telescopic construction, or one part of a rafter may be movable in relation to another part of the same rafter to be able to prolong or decrease the length of each rafter.

In one embodiment, four rafters 21, two in each side, are made adjustable. When transporting the nacelle 1, all rafters 21 other than the four adjustable rafters are positioned inside the nacelle, and the four adjustable rafters are reduced in height in order to comply with the height restrictions for transports on ground.

In the embodiments of FIGS. 1-4, 15, 18, and 23, at least part of the front part 8 of the nacelle is removed in order to fold the nacelle into its transported position and thus decrease the height of the nacelle.

In the embodiments of FIG. 25-30, the nacelle 1 does not have a detachable front part 8, but the back part still has to be removed. In another embodiment, it is the front part 8 which is removed when preparing the nacelle for transport, whereas the back part of the nacelle is not detachable.

By a front part 8 and a back part is meant any kinds of detachable end faces.

By a wind turbine is meant any kind of apparatus able to convert wind power into electricity, such as a wind generator, wind power unit (WPU), or wind energy converter (WEC). And by a wind turbine nacelle 1 is meant any kind of housing housing the drive train 26 of the wind turbine, e.g. the generator, the gear, etc.

Although the invention has been described above in connection with preferred embodiments of the invention, it will be evident for a person skilled in the art that several modifications are conceivable without departing from the invention as defined by the following claims.

The invention claimed is:

1. A nacelle for a wind turbine, the nacelle having a first height in an installed position and a second height in a transported position, the first height being greater than the second height, comprising:
a main frame structure,
a bottom part connected to the main frame structure and having a bottom face and two opposite side faces defining a space and a width of the bottom part, the bottom part also having a top part,
wherein when the nacelle is in the transported position, the top part extends inside the width of the bottom part, or outside the width of the bottom part, in order to cover at least part of the space.

2. The nacelle according to claim 1, wherein the top part comprises two parts, wherein the two parts of the top part are separated from each other in the transported position of the nacelle in order for the top part to extend outside the width of the nacelle or overlap each other in the transported position of the nacelle in order for the top part to extend inside the width of the nacelle.

3. The nacelle according to claim 1, wherein the top part comprises a top face and two intermediate parts intermediate the side faces and the top face, wherein the two intermediate parts are dismounted in the transported position.

4. The nacelle according to claim 3, wherein a part of the intermediate part overlaps a predetermined part of the top face in the installed position, and wherein the intermediate part overlaps a smaller part of the top face than the predetermined part in the transported position.

5. The nacelle according to claim 1, wherein the second height in the transported position is equal to or less than 4 m.

6. The nacelle according to claim 1, wherein the main frame structure is arranged so that at least part of the top part is supported by the main frame structure in the transported position.

7. The nacelle according to claim 6, wherein the main frame structure comprises at least two support beams arranged along each side face.

8. The nacelle according to claim 1, further comprising at least one connection part for connecting the top part to the bottom part, wherein the connection part is substantially inside the nacelle in the installed position.

9. The nacelle according to claim 8, wherein the connection part is used as support for at least part of the top part in the transported position.

10. The nacelle according to claim 1, further comprising a transport kit having transportation parts for enabling a cover of the space in the transported position.

11. The nacelle according to claim 10, wherein the transportation parts are arranged inside the nacelle in the transported position to provide a support of at least part of the top part.

12. The nacelle according to claim 10, wherein the transportation parts comprise sealing means.

13. The nacelle according to claim 1, further comprising a plurality of rafters.

14. The nacelle according to claim 13, wherein at least one of the rafters is adjustable in height.

15. The nacelle according to claim 1, further comprising detachable end faces.

16. A transport method for transporting a nacelle according to claim 1, the method comprising the step of placing at least part of the top part in a position that overlaps part of the side faces of the bottom part in the transported position.

17. The transport method according to claim 16, further comprising the step of placing at least one of intermediate parts and connection parts inside the space.

18. A nacelle for a wind turbine, the nacelle having a first height in an installed position and a second height in a transported position, the first height being greater than the second height, comprising:
a main frame structure,
a bottom part connected to the main frame structure and having a bottom face and two opposite side faces defining a space and a width of the bottom part, the bottom part also having a top part,
wherein the top part comprises a top face and two intermediate parts intermediate the side faces and the top face, and wherein the intermediate parts are dismounted and the top face is arranged on the side faces of the bottom part in order to cover at least part of the space in the transported position.

19. The nacelle according to claim 18, wherein the main frame structure is arranged so that at least part of the top part is supported by the main frame structure in the transported position.

* * * * *